(12) United States Patent
Saeki

(10) Patent No.: US 6,983,981 B2
(45) Date of Patent: Jan. 10, 2006

(54) VEHICLE BODY STRUCTURE

(75) Inventor: Hidetsugu Saeki, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/892,239

(22) Filed: Jul. 16, 2004

(65) Prior Publication Data

US 2005/0023862 A1 Feb. 3, 2005

(30) Foreign Application Priority Data

Aug. 1, 2003 (JP) .............................. 2003-284997
Nov. 27, 2003 (JP) .............................. 2003-397840

(51) Int. Cl.
*B60J 7/00* (2006.01)
(52) U.S. Cl. .............................. 296/187.12; 296/203.03
(58) Field of Classification Search ............ 296/187.12, 296/203.03, 193
See application file for complete search history.

(56) References Cited

U.S. PATENT DOCUMENTS

| | | | | |
|---|---|---|---|---|
| 5,096,254 A | * | 3/1992 | Sparke | 296/203.03 |
| 5,246,264 A | * | 9/1993 | Yoshii | 296/187.12 |
| 5,382,071 A | * | 1/1995 | Enning et al. | 296/187.12 |
| 5,671,968 A | * | 9/1997 | Masuda et al. | 296/187.12 |
| 6,059,899 A | * | 5/2000 | Shibata et al. | 148/320 |
| 6,139,094 A | * | 10/2000 | Teply et al. | 296/203.03 |
| 6,179,370 B1 | * | 1/2001 | Takeuchi | 296/187.12 |
| 6,267,438 B1 | * | 7/2001 | Jonsson | 296/187.12 |
| 6,270,152 B1 | * | 8/2001 | Sato | 296/203.02 |
| 6,279,990 B1 | * | 8/2001 | Miyasaka et al. | 296/203.03 |
| 6,299,239 B1 | * | 10/2001 | Sagawa et al. | 296/187.12 |
| 6,409,257 B1 | * | 6/2002 | Takashina et al. | 296/187.12 |
| 6,854,795 B2 | * | 2/2005 | Yamazaki et al. | 296/187.12 |
| 6,908,128 B2 | * | 6/2005 | Strong | 293/128 |
| 2005/0046233 A1 | * | 3/2005 | Saeki | 296/187.12 |
| 2005/0151363 A1 | * | 7/2005 | Saeki | 280/784 |

FOREIGN PATENT DOCUMENTS

JP 3335781 B2 8/2002

* cited by examiner

*Primary Examiner*—Kiran B. Patel
(74) *Attorney, Agent, or Firm*—Shinjyu Global IP Counselors, LLP

(57) ABSTRACT

A vehicle body structure is configured to convert a lateral-impact input to an input that acts on a pillar member in substantially a vertical direction of the vehicle body. The vehicle body structure has an input conversion structure configured to convert a side-impact input that acts inwardly on the pillar member in a substantially horizontal direction from the vehicle exterior to an input that is applied to the pillar member in the vertical direction of the vehicle body. Thus, the side-impact input can be converted as an input that is applied to the pillar member in the vertical direction of the vehicle body, so that the input can be absorbed as a compression load applied to the pillar member in the longitudinal direction, and deformation into the passenger compartment can be minimized.

37 Claims, 31 Drawing Sheets

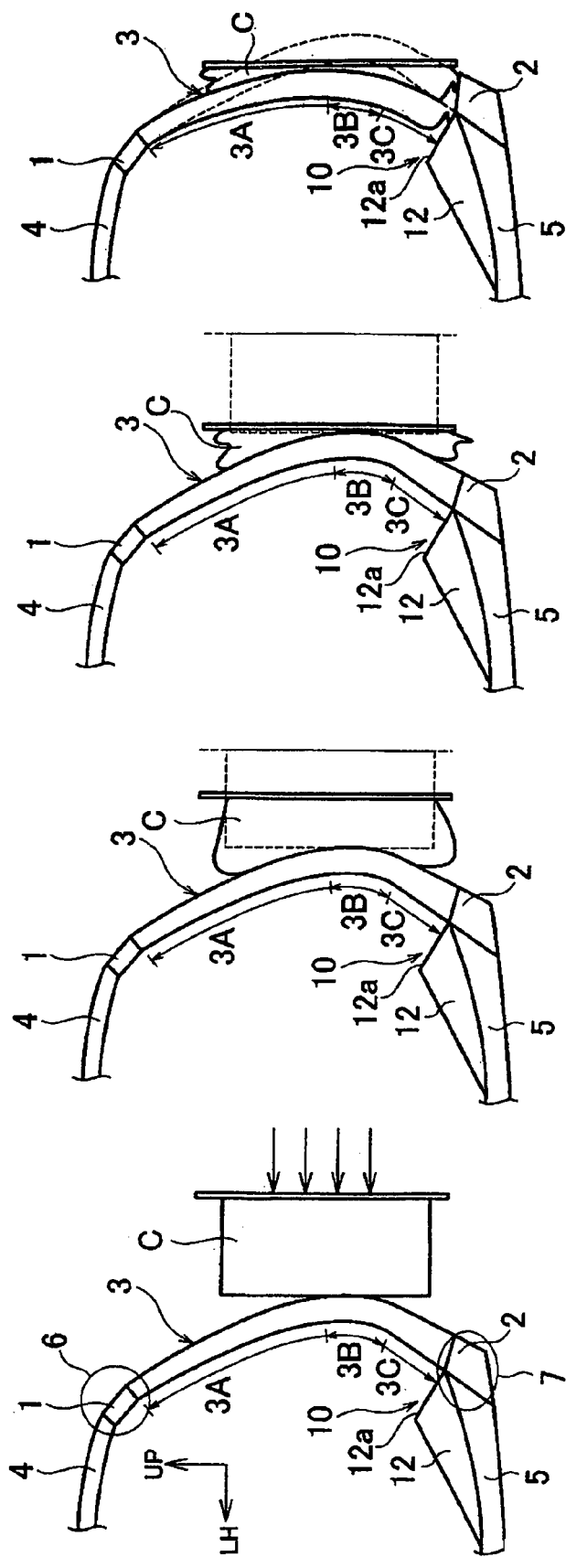

VEHICLE BODY STRUCTURE

BACKGROUND OF THE INVENTION

1. Field of the Invention

The present invention generally relates to a vehicle body structure for automobiles. More specifically, the present invention relates to a vehicle body structure that is configured to absorb the energy of a side impact.

2. Background Information

Some conventional vehicle body structures have been proposed that include structures in which a strength discontinuity is provided to minimize localized bending of the center pillar of a vehicle. Specifically, the strength discontinuity is provided at a lower section of a center pillar with a closed cross-sectional structure around the entire circumference. Thus, the structure bends into the passenger compartment in an appropriate manner at the strength discontinuity during a side impact, such that localized bending at the middle area and the upper area of the center pillar is prevented. In other words, the center pillar is displaced into the passenger compartment in a substantially uniform manner, and the amount of inward deformation is relatively small at the middle area. One example of such a vehicle body structure is disclosed in Japanese Patent No. 3335781 (see, pages 3–4, FIG. 6).

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

It has been discovered that in such a conventional lateral surface structure of a vehicle body as disclosed in Japanese Patent No. 3335781 since the lower section of the center pillar having the strength discontinuity bends into the passenger compartment during initial impact, the strength of the vehicle body is determined by its bending strength, and it is difficult to expect a great improvement in strength.

Also, during a side impact, tension is applied to the center pillar when it has moved into the passenger compartment in a substantially uniform manner at an amount greater than the bending deformation. Thus, the arch shape as the initial state of the center pillar is extended, and a state is established in which an input is constantly applied so as to cause the center pillar to bend in the opposite direction.

Therefore, when the lower section of the center pillar temporarily deforms into the passenger compartment, the deforming movement into the passenger compartment becomes continuous in accordance with the continuing input of a side-impact load. Accordingly, the amount by which the center pillar moves into the passenger compartment is increased.

For this reason, it is necessary to balance two approaches aimed at preventing localized bending in the pillar middle section: one whereby the pillar middle section is adequately reinforced, and one in which the supporting force of the top and bottom ends of the pillar is reduced to reduce the load on the pillar. However, a significant increase in weight is a matter of concern if the pillar is merely reinforced. Also, it is difficult to improve the strength of the vehicle body when the supporting force is reduced. Thus, each approach has potential drawbacks.

Moreover, demand has increased in recent years for more convenience due to diversification in the size and shape of vehicles. Accordingly, comprehensive improvements need to be made for controlling the mode of the inward movement of center pillar and increasing the strength of the vehicle body.

In view of this, the present invention is intended to provide a vehicle body structure whereby the weight of the pillar member can be decreased and the strength improved by converting a side-impact input that is applied to the pillar member to an input that is directed vertically in relation to the vehicle body, and maintaining this input conversion.

In accordance with one aspect of the present invention, a vehicle body structure is provided that basically comprises a pillar member, an upper vehicle body support, a lower vehicle body support and an input conversion structure. The pillar member is configured and arranged to extend in a generally vertical direction of the vehicle body structure between an upper pillar end section and a lower pillar end section. The upper vehicle body support is configured and arranged to restrict upward movement of the upper pillar end section of the pillar member. The lower vehicle body support is configured and arranged to restrict downward movement of the lower pillar end section of the pillar member. The input conversion structure is configured and arranged relative to the pillar member such that a side-impact input applied inward to the pillar member in a generally horizontal direction from a vehicle exterior is converted as an input that is applied longitudinally along the pillar member in the generally vertical direction of the vehicle body structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a series of partial diagrammatic elevational view of the center pillar area on one side of vehicle body frame showing the deformation modes during side impact in the sequence of (a) through (d) in accordance with the first embodiment of the present invention;

DETAILED DESCRIPTION OF THE PREFERRED EMBODIMENTS

Figure 1:
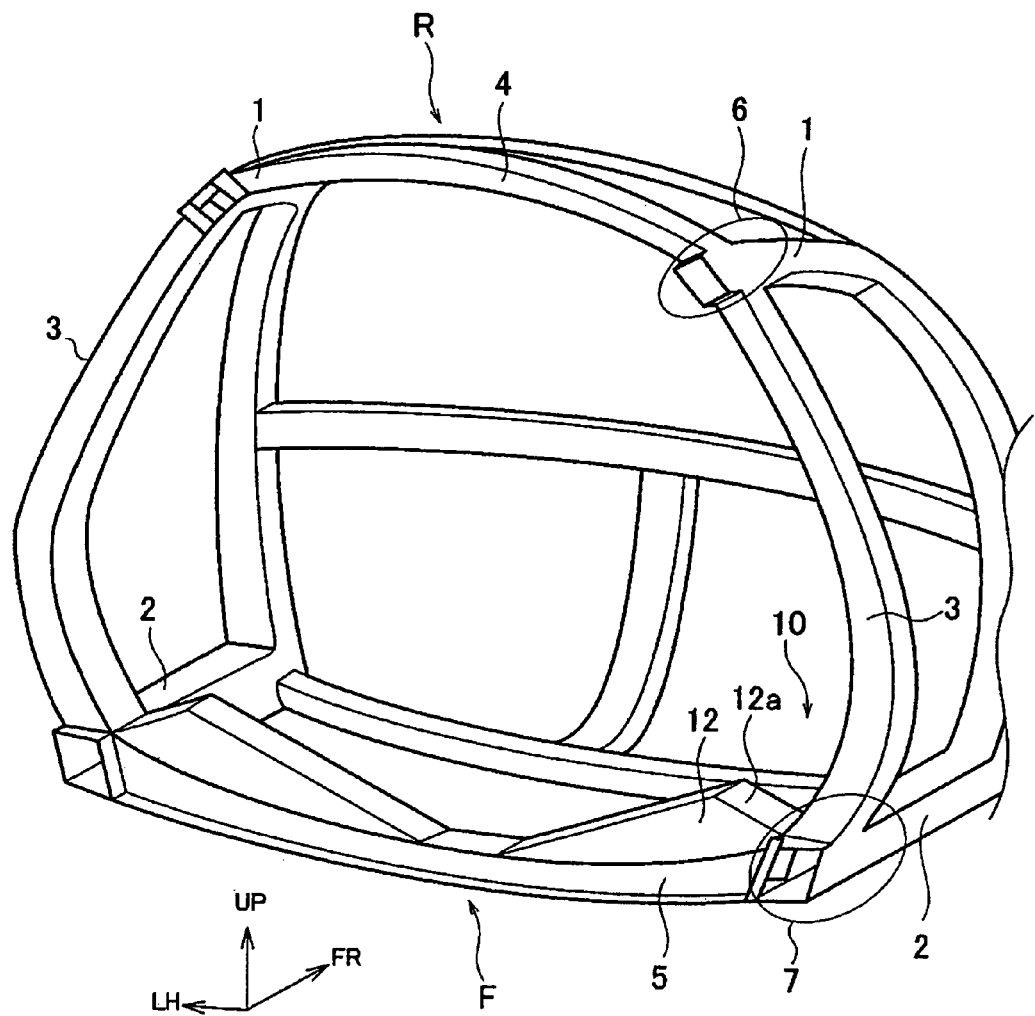
FIG. 1 is a simplified partial rear perspective view of a vehicle body frame or vehicle body structure of a vehicle passenger compartment section as seen from the rear of an automobile in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

First Embodiment

Referring initially to FIGS. 1–13, a vehicle body structure is illustrated in accordance with a first embodiment of the present invention. Basically, the lateral surface structure of the vehicle body structure in accordance with the first embodiment includes a pair of left and right side roof rails 1, a pair of left and right side sills 2, a pair of center pillars 3, a plurality of roof cross members 4 and a plurality of floor cross members 5.

The side roof rails 1 extend generally in a longitudinal direction of the vehicle (i.e., forward and backward along the vehicle body on both lateral sides of the vehicle) along the roof section R. The side sills 2 extend in a longitudinal direction of the vehicle along the vehicle body on both lateral sides of the vehicle on the floor section F. The center pillars 3 are curved pillar members that bow outwardly from the vehicle. The center pillars 3 connect the side roof rails 1 and the side sills 2 together in the vertical direction of the vehicle body. The roof cross member 4 is configured and arranged for connecting the side roof rails 1 at the connecting positions of the center pillars 3 of the vehicle. The floor cross member 5 is configured and arranged for connecting the side sills 2 at the connecting positions of the center pillar 3 of the vehicle, as shown in FIG. 1.

The vehicle body structure also includes an input conversion structure 10 whereby a force from a side-impact that is applied inward to the center pillar 3 in a substantially horizontal direction from the vehicle exterior is converted/maintained as to a force that is applied to the center pillar 3 in the vertical direction of the vehicle body. Thus, the vehicle body structure of the present invention is advantageous in that input can be absorbed as compression weight in the longitudinal direction of the pillar members 3 to minimize deformation into the passenger compartment. Moreover, the weight of the pillar members 3 can be reduced and the strength increased because side-impact input is converted/maintained as input that is applied to the pillar members 3 in the vertical direction of the vehicle body by the input conversion structure 10 when side-impact input is applied inward in a substantially horizontal direction to the pillar members 3 from the vehicle exterior.

Figure 2:
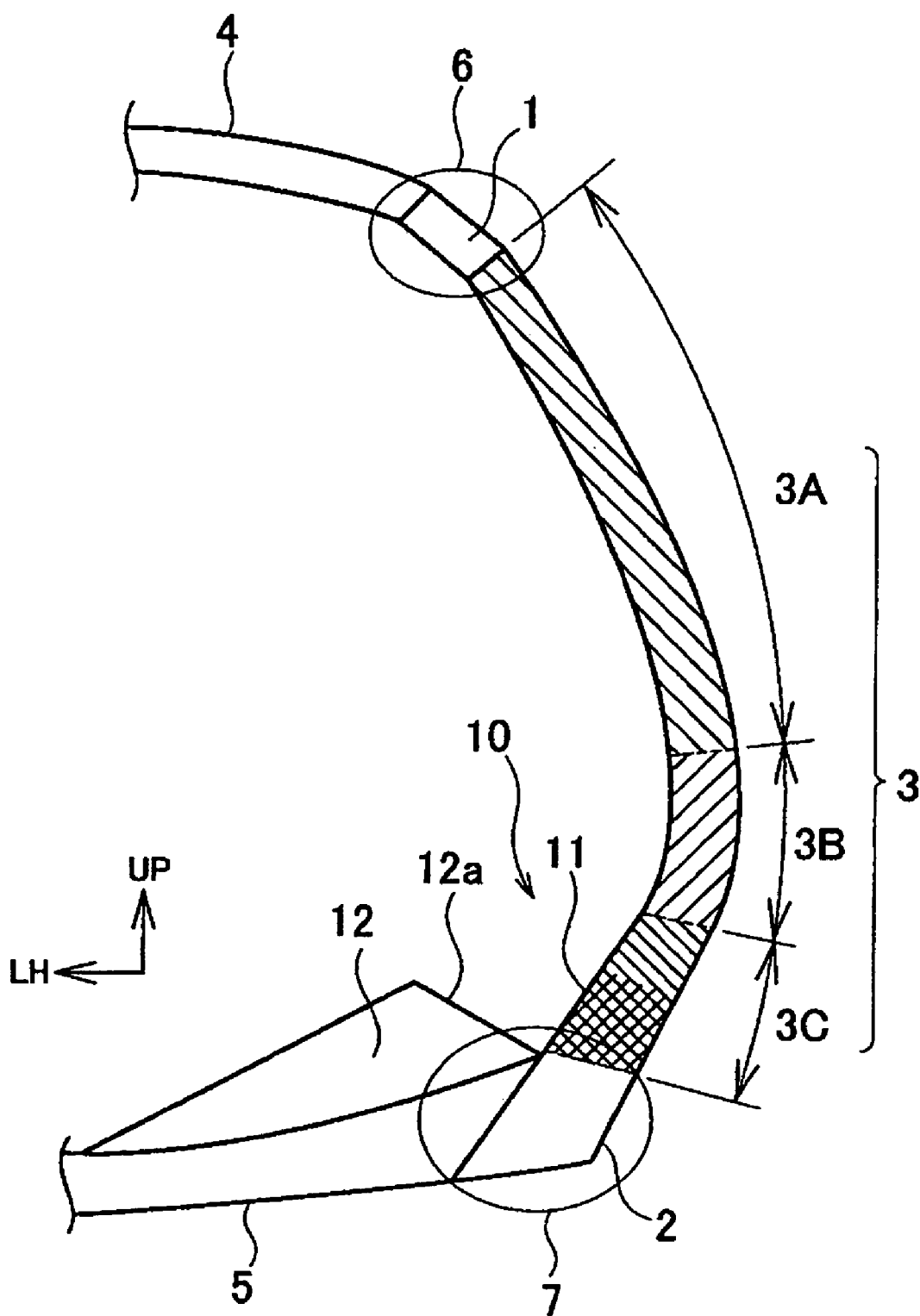
FIG. 2 is a simplified partial rear elevational view of one side of vehicle body structure showing the relationship between a center pillar and a guide section in accordance with the first embodiment of the present invention.
Figure 3:
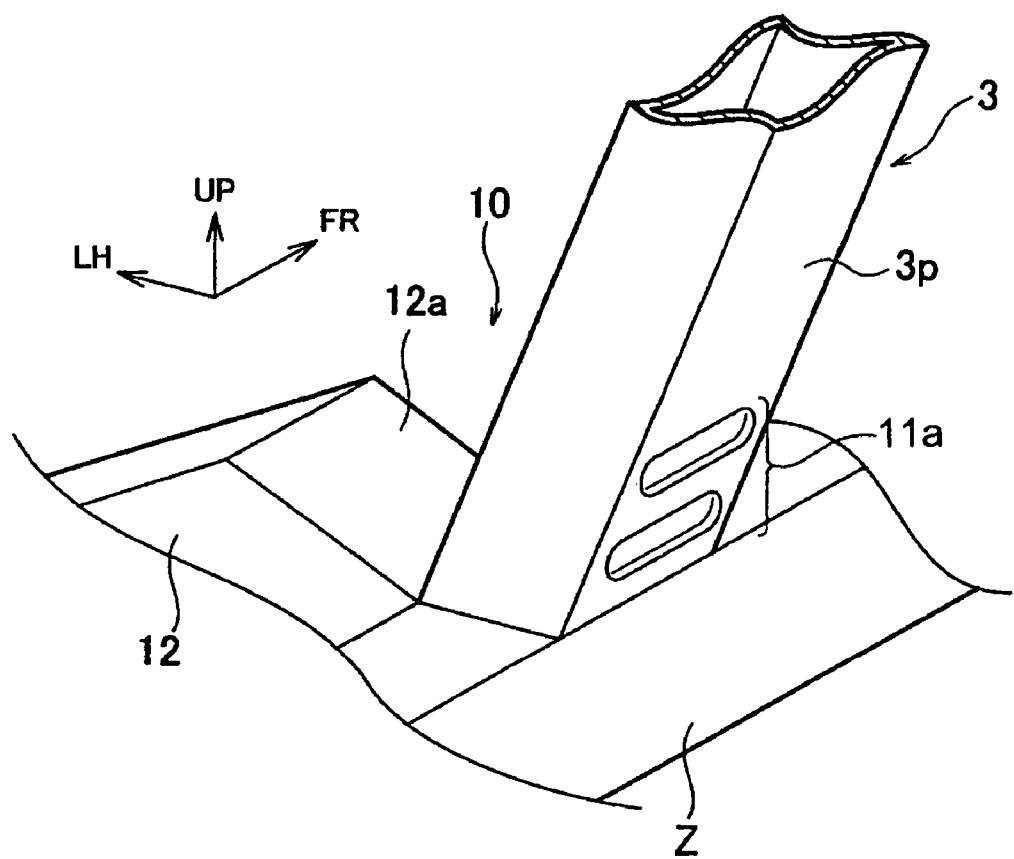
FIG. 3 is an enlarged partial perspective view of a deformable section disposed at a bottom end portion of the center pillar in accordance with the first embodiment of the present invention.

The input conversion structure 10 includes the bottom part of the center pillar 3 that protrudes and curves outward as shown in FIG. 2. In particular, the input conversion structure 10 includes a deformable section 11 and a guide section 12. The deformable section 11 is configured with concave beads 11*a* that serve as an area of reduced strength. In the illustrated embodiment, the beads 11*a* of the deformable section 11 are provided on the outer wall 3*p* at the lower pillar end section of the center pillar 3. The guide section 12 is provided adjacent the lower pillar end section of the center pillar 3 and is intended to generate compressive force in the axial direction of the center pillar 3 in accordance with the movement of the lower pillar end section of the center pillar 3 into the passenger compartment, as shown in FIG. 3.

The curved center pillar 3 is designed with basically three sections: a top or upper pillar section 3A, a protruding pillar section 3B and a bottom or lower pillar section 3C. The protruding section 3B is defined as the area, which bears the side-impact load since it protrudes outward to the greatest extent. The center pillar 3 forms an overall approximate C shape extending from the top pillar section 3A, provided above the protruding section 3B, to the bottom pillar section 3C, provided below the protruding section 3B. The top pillar section 3A is joined to the side roof rails 1 via a high-rigidity upper connecting section 6, and the bottom pillar section 3C is joined to the side sills 2 via a high-rigidity lower connecting section 7, as shown in FIG. 2.

In other words, the upper connecting section 6 is an area where the side roof rails 1, the center pillar 3, and the roof cross member 4 connect in a cross shape, while the lower connecting section 7 is an area where the side sills 2, the center pillar 3, and the floor cross member 5 connect in a cross shape.

At these points, the rigidity of the upper connecting section 6 and the lower connecting section 7 in the vertical and widthwise directions of the vehicle body are greater than the rigidity of the top pillar section 3A and the bottom pillar section 3C in the longitudinal direction.

Figure 4:
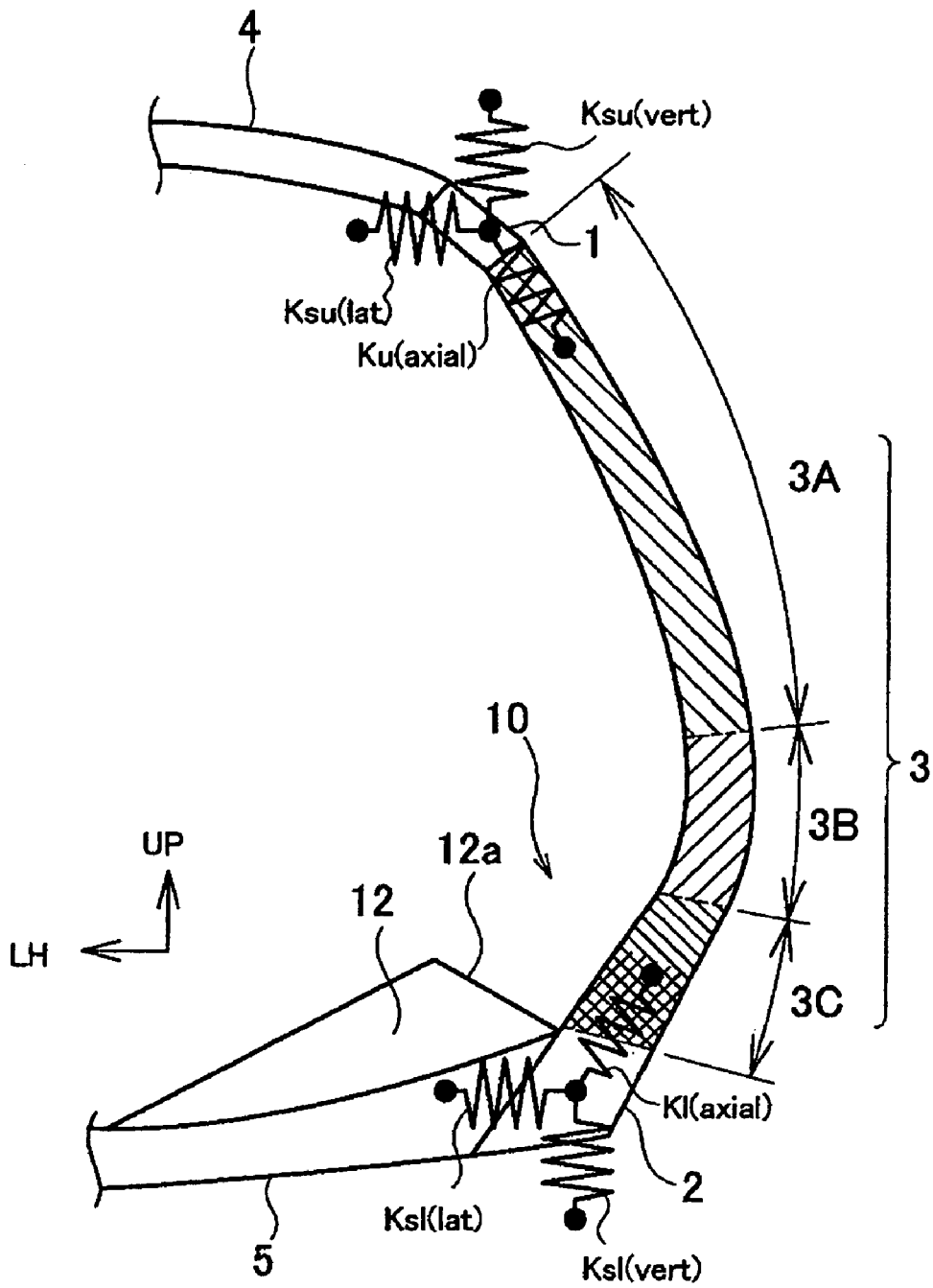
FIG. 4 is a simplified partial diagrammatic elevational view of the center pillar area on one side of vehicle body frame that is marked up to show the rigidity relationship between the top and bottom connecting sections of the center pillar in accordance with the first embodiment of the present invention.
Figure 5:
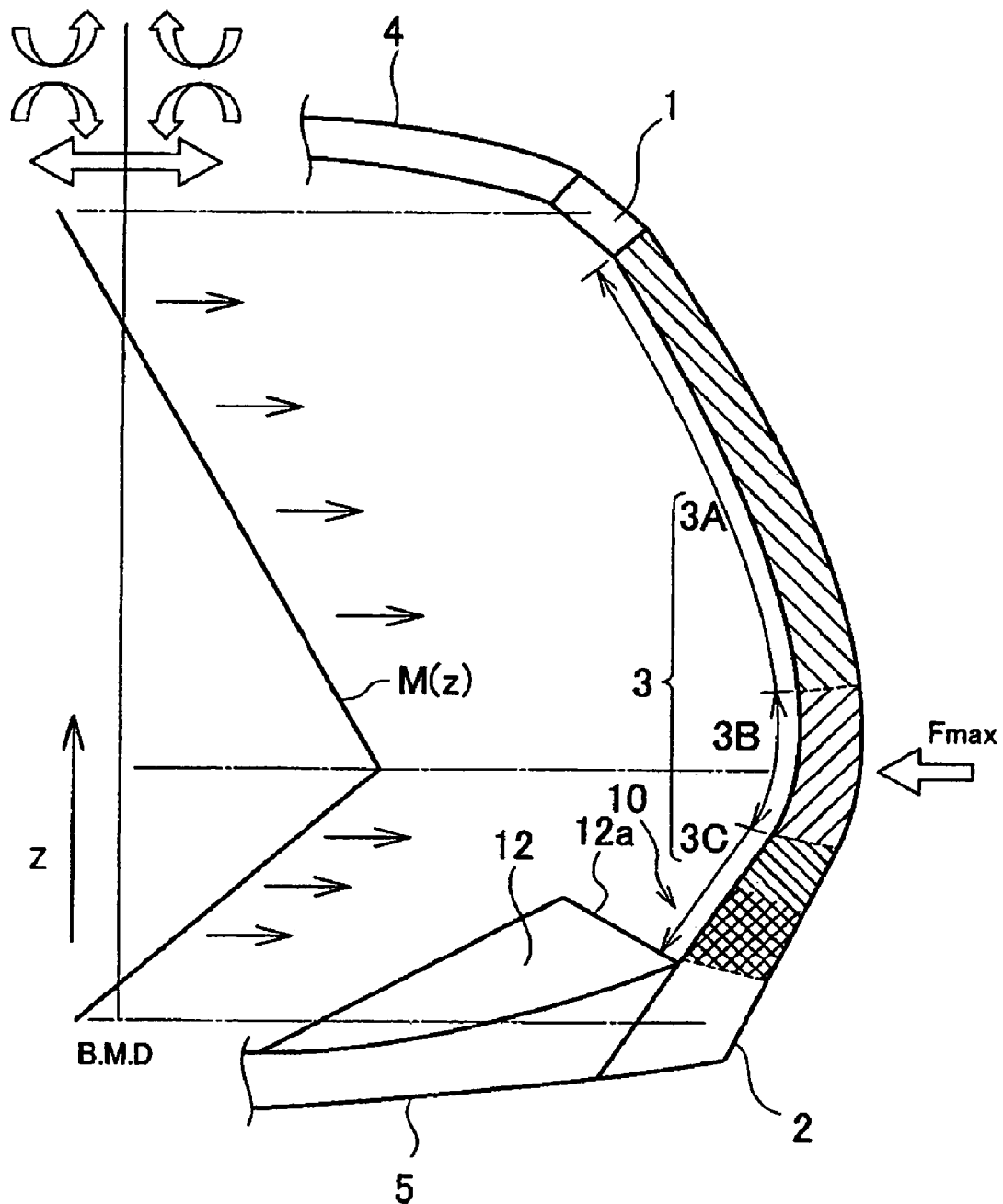
FIG. 5 is a simplified partial diagrammatic elevational view of the center pillar area on one side of vehicle body frame that is marked up to show the required characteristics for the yield moment of the center pillar in accordance with the first embodiment of the present invention.
Figure 6A:
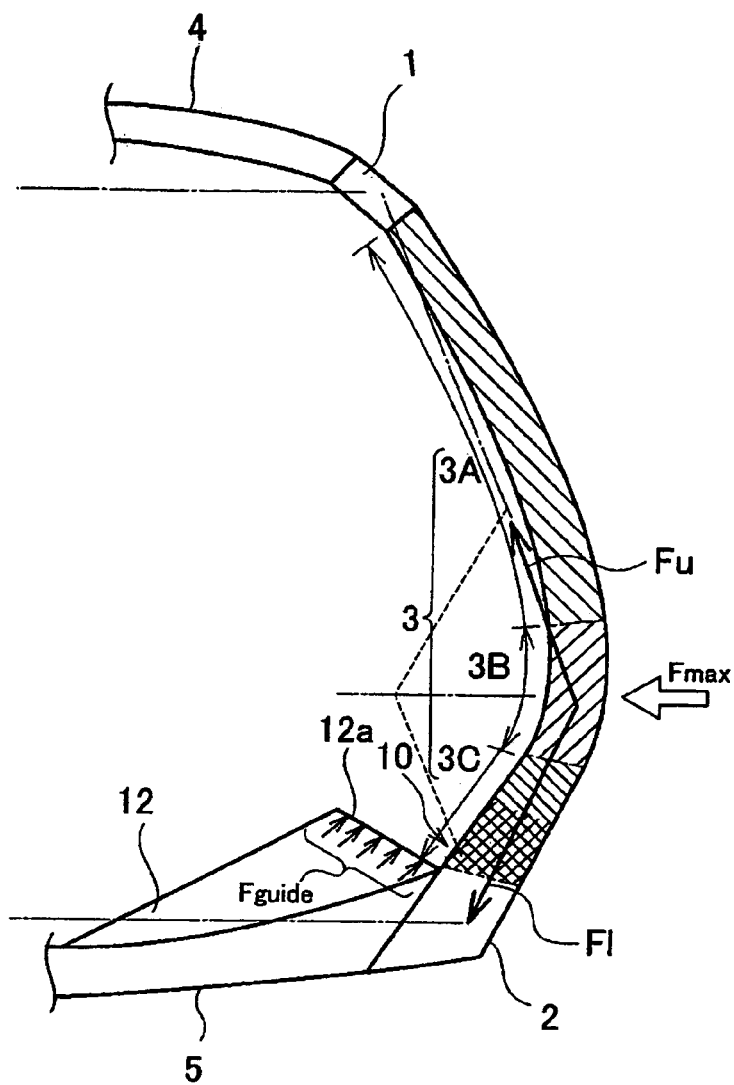
FIG. 6(*a*) is a partial diagrammatic elevational view of the center pillar area on one side of vehicle body frame that is marked up to show the crushing characteristics in the pillar lower section.
FIG. 6(b) is a graph that shows the strength characteristics of the guide section occurring during a side impact in accordance with the first embodiment of the present invention.
Figure 6B:
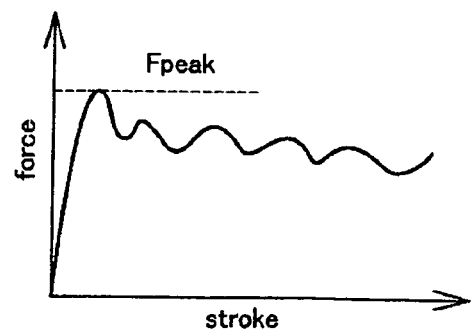

The presence of the beads 11*a* results in a situation in which the longitudinal rigidity Kl (axial) of the bottom pillar section 3C of the center pillar 3 is less than the longitudinal rigidity Ku (axial) of the top pillar section 3A (Kl (axial)<Ku (axial)), as shown in FIG. 4. Thus, the yield strength against the moment generated in the top pillar section 3A and the bottom pillar section 3C, which is directed into the passenger compartment around the lengthwise direction of the vehicle, is greater than the moment M(z) generated in the top pillar section 3A and the bottom pillar section 3C and determined by geometrical conditions when the maximum reaction force Fmax for the compressive force in the widthwise direction of the vehicle is applied to the protruding section 3B located at the middle section of the center pillar 3, as shown by the group of arrows in FIG. 5. Also the longitudinal axial collapse strength Fpeak of the bottom pillar section 3C of the center pillar 3 is set smaller than the longitudinal loads Fu and Fl applied to the top pillar section 3A and bottom pillar section 3C when the maximum reaction force Fmax is exerted, as shown in FIG. 6.

However, the longitudinal rigidity Ku (axial) of the top pillar section 3A shown in FIG. 4 is set smaller than the resultant force of the horizontal rigidity Ksu (lat) and the vertical rigidity Ksu (vert) ($\sqrt{\{Ksu(lat)^2+Ksu(vert)^2\}}$). Also, the longitudinal rigidity Kl (axial) of the bottom pillar section 3C is set smaller than the resultant force of the horizontal rigidity Ksl (lat) and the vertical rigidity Ksl (vert) ($\sqrt{\{Ksl(lat)^2+Ksl(vert)^2\}}$). Also, the longitudinal axial collapse strength Fpeak of the bottom pillar section 3C shown in FIG. 6(*a*) is set smaller than the supporting strength Fguide of the guide surface 12*a* of the guide section 12.

Figure 7:
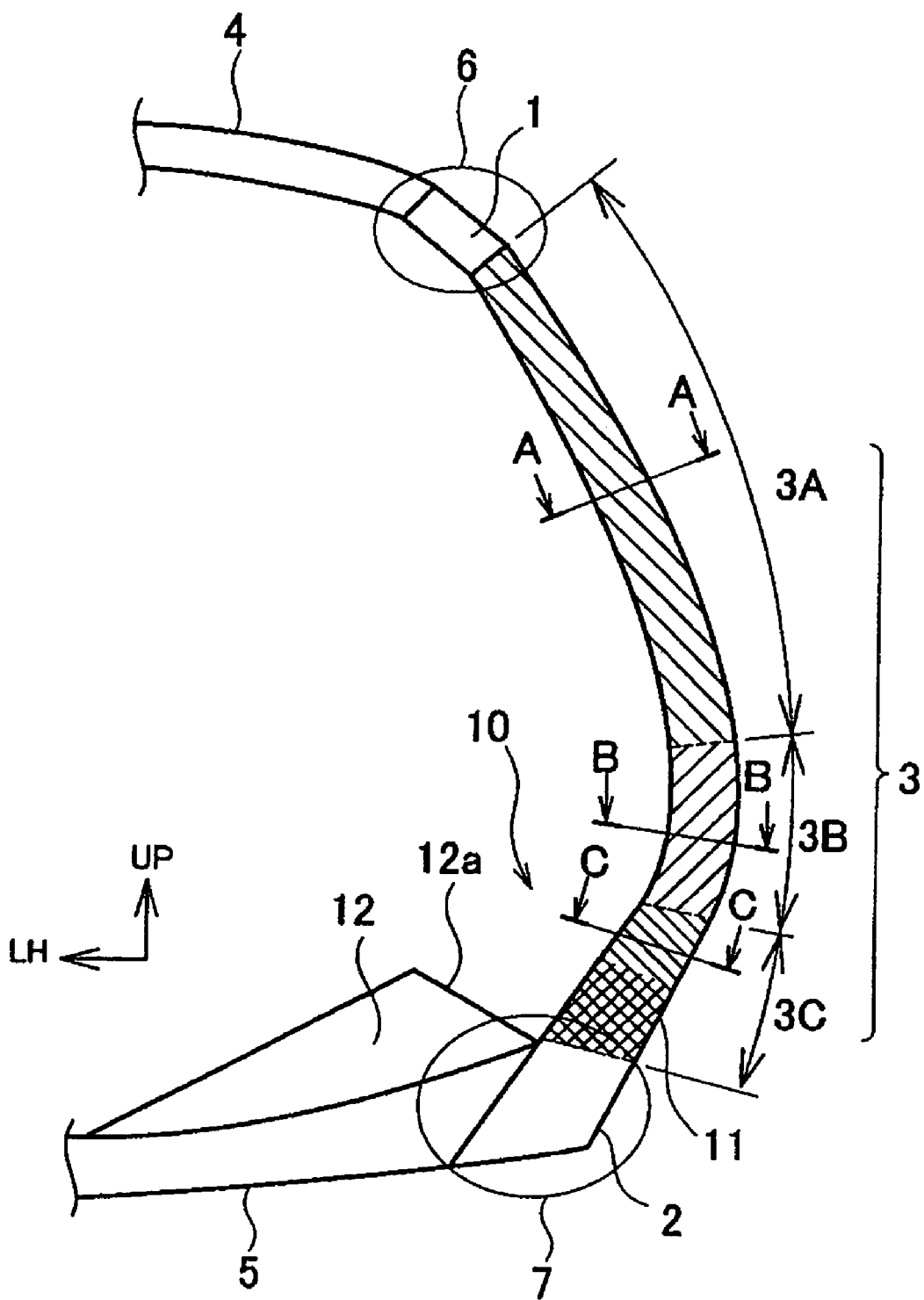
FIG. 7 is a simplified partial rear elevational view of one side of vehicle body frame showing the relationship between the center pillar and the guide section that is marked up to show the rigidity relationship between the top and bottom connecting sections of the center pillar in accordance with the first embodiment of the present invention.
Figure 8A:
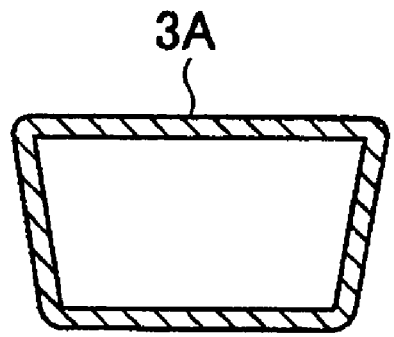
FIG. 8(a) is an enlarged cross-sectional view of the center pillar as seen along section line A—A in FIG. 7.
Figure 8B:
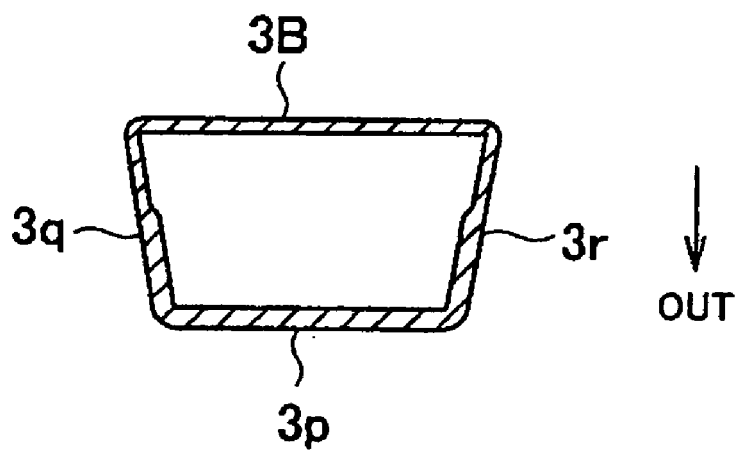
FIG. 8(b) is an enlarged cross-sectional view of the center pillar as seen along section line B—B in FIG. 7.
Figure 8C:
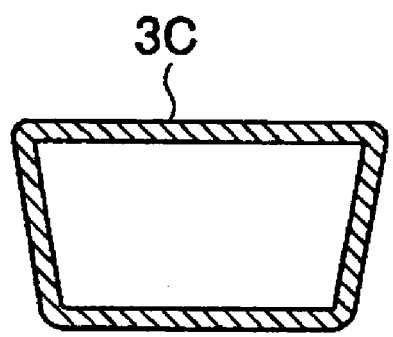
FIG. 8(c) is an enlarged cross-sectional view of the center pillar as seen along section line C—C in FIG. 7.

FIGS. 7 and 8 show the stiffness of the center pillar 3 at various points due to the construction of the center pillar 3. The center pillar 3 preferably gradually increases in cross-sectional area from the top pillar section 3A to the bottom pillar section 3C, as shown in FIGS. 8(a) to 8(c). The center pillar 3 has a variable wall thickness in the protruding section 3B with a thick structure in the protruding section 3B extending from near the midpoint of the front and back walls 3q and 3r of the protruding section 3B to the outer wall 3p of the protruding section 3B.

Figure 9:
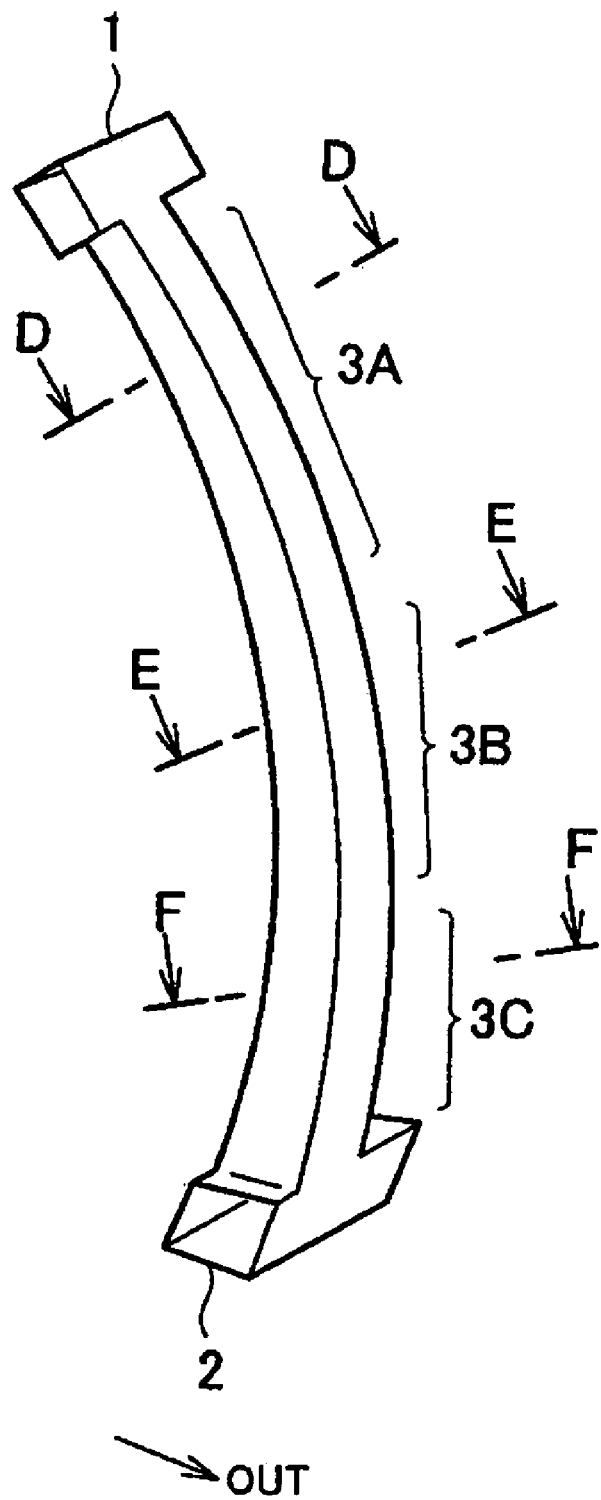
FIG. 9 is a partial rear perspective view of the center pillar, as seen from the rear surface, in accordance with the first embodiment of the present invention.
Figure 10A:
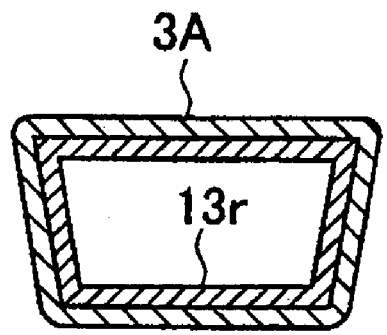
FIG. 10(a) is an enlarged alternate cross-sectional view of the center pillar as seen along section line D—D in FIG. 9.
Figure 10B:
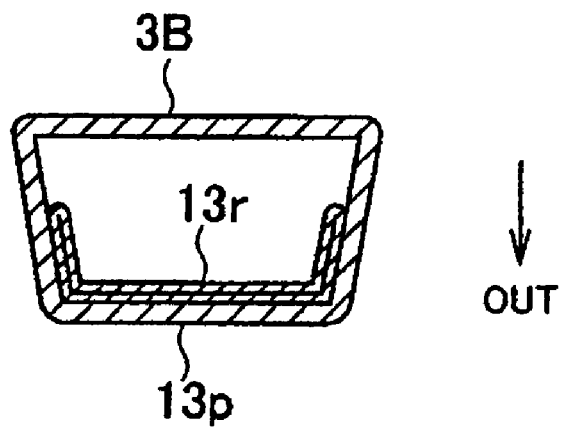
FIG. 10(b) is an enlarged alternate cross-sectional view of the center pillar as seen along section line E—E in FIG. 9.
Figure 10C:
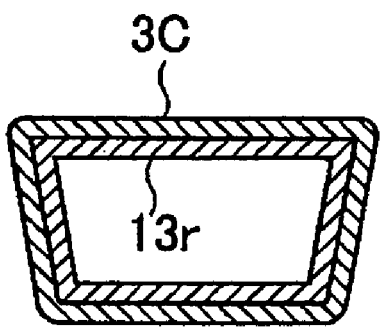
FIG. 10(c) is an enlarged alternate cross-sectional view of the center pillar as seen along section line F—F in FIG. 9.

Alternatively, the center pillar 3 can be stiffen as shown in FIGS. 9 and 10. In this case, a reinforcing wall 13r is provided to the entire inner surface of the center pillar 3, the area of the reinforcing wall 13r toward the vehicle interior is crushed outward in the protruding section 3B, and the outer wall 13p is structured with the reinforcing wall 13r having a double layer.

Also, the guide section 12 has an overall approximately triangular shape wherein the peak is at the top as seen from the longitudinal direction of the vehicle body. The guide section 12 has an inclined guide surface 12a that faces the exterior of the vehicle body and that is inclined in the direction opposite the inclined direction of the bottom pillar section 3C of the center pillar 3, as shown in FIGS. 1 and 2.

The guide section 12 is fixedly supported on the floor cross member 5 of the floor section F. The strength, as measured in the vertical and widthwise directions of the vehicle, of the guide section 12 and of the floor cross member 5 on which the guide section 12 is fixedly supported is greater than the longitudinal axial collapse strength of the bottom pillar section 3C.

According to the first embodiment thus configured, the center pillar 3 curves in an approximate C shape from the top pillar section 3A to the bottom pillar section 3C, with the curve peaking at the protruding section 3B. The top pillar section 3A and bottom pillar section 3C are supported on the side roof rails 1 and the side sills 2 by the high-rigidity upper connecting section 6 and lower connecting section 7. At the start of the side impact as shown in FIGS. 11(a) through (c), the load from a colliding object C is initially absorbed by the protruding section 3B. Then, the top pillar section 3A and bottom pillar section 3C are thrust against the upper and lower connecting sections 6 and 7, whereby the reaction force of the vehicle body at the start of impact is generated more quickly and deformation of the vehicle body is suppressed.

Figure 12:
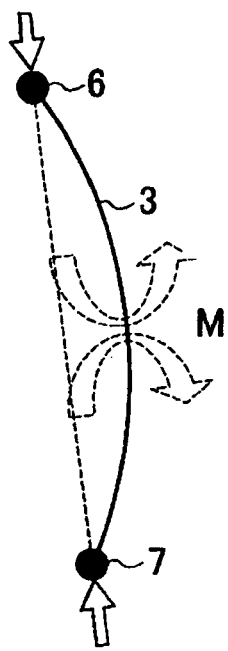
FIG. 12 is an explanatory diagram of the mechanism of generating an internal stress moment applied to the curved area of the center pillar in accordance with the first embodiment of the present invention.

Also, in order for the top pillar section 3A and the bottom pillar section 3C to curve as such, a moment M that forms an outward convexity in the widthwise direction of the vehicle is induced as internal force, as shown in FIG. 12, when compressive force is applied in the longitudinal direction. This moment M is applied in the opposite direction from the moment of external force applied by the impact load during side impact so that the center pillar 3 forms an inward convexity in the widthwise direction of the vehicle. Therefore, canceling out the moment of external force makes it possible to reduce the load applied to the center pillar 3 due to the impact load. Consequently, this makes it possible to improve the reaction force of the vehicle body against the colliding object C in a more efficient manner.

Figure 13:
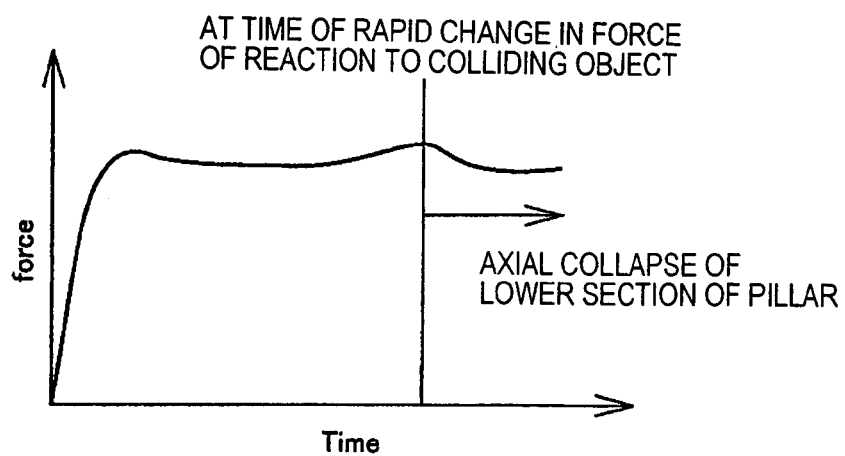
FIG. 13 is a graph showing the change over time in the reactive force of the vehicle body during side impact in accordance with the first embodiment of the present invention.

Therefore, the reaction force of the vehicle body resulting from the thrusting out of the top pillar section 3A and the bottom pillar section 3C can be maintained similar to the start of impact as shown in FIG. 13. In other words, since this side-impact input is converted by the input conversion structure 10 and maintained as input that is applied to the center pillar 3 in the vertical direction of the vehicle body, it is possible to reduce the amount of deformation into the passenger compartment by absorbing the input as a compression load in the longitudinal direction of the center pillar 3, and to reduce the weight and to improve the strength of the center pillar 3.

The rigidity of the members discussed in this embodiment also includes the magnitude of the peak load when the actual members undergo a transition to elastic deformation. The same applies to the second through fifth embodiments discussed hereinafter.

The operational effects achieved in this embodiment are augmented by the fact that the input conversion structure 10 is configured from the beads 11a provided to the lower pillar end section of the outwardly curving center pillar 3 and from the guide section 12 provided to the lower pillar end section of the center pillar 3 so as to generate a compressive force in the axial direction in accordance with the movement of the lower pillar end section of the center pillar 3 into the passenger compartment. Therefore, the beads 11a suppress an extreme increase in the load on the center pillar 3. The beads 11a function as a diffusing mechanism against localized deformation in the pillar upper and lower sections 3A and 3C. The protruding section 3B and the guide section 12 cooperate to generate a compressive force in the bottom pillar section 3C during the deformation process, which makes it possible to maintain the reaction force of the vehicle body resulting from the thrusting out of the top pillar section 3A and the bottom pillar section 3C in the same manner as at the start of impact.

Also, the center pillar 3 is designed so that the area to which the side-impact load is applied protrudes outward to the greatest extent serves as the protruding section 3B. Thus, the center pillar forms an overall approximate C shape extending from the top pillar section 3A to the bottom pillar section 3C. The top pillar section 3A is joined to the side roof rails 1 via the high-rigidity upper connecting section 6, while the bottom pillar section 3C is joined to the side sills 2 via the high-rigidity lower connecting section 7. Therefore, the input load from the colliding object C during side impact is absorbed by the protruding section 3B, and the top pillar section 3A and the bottom pillar section 3C are thrust out between the upper and lower connecting sections 6 and 7. This makes it possible to generate the reaction force of the vehicle body during the start of impact more quickly.

Also, the top pillar section 3A and the bottom pillar section 3C are curved as such, so when a compressive force is applied in the longitudinal direction, a moment that forms a convexity externally in the widthwise direction of the vehicle is induced as internal force. This induced moment is applied in the opposite direction from the moment of external force applied to cause the center pillar 3 to form a convexity on the inside in the widthwise direction of the vehicle due to the impact load acting during side impact. Specifically, the convexity of the center pillar 3 extends in a direction that cancels out this moment, which makes it possible to reduce the load applied to the center pillar 3 due to the impact load.

Specifically, the maximum value of the reaction force of the vehicle body against the colliding object C can be more efficiently improved without relying on component reinforcements typified by patching or the like.

Furthermore, the rigidity, both in the vertical direction and in the widthwise direction of the vehicle body, of the upper connecting section 6 and the lower connecting section 7 in which the center pillar 3 is connected to the side roof rails 1 and side sills 2, respectively, is greater than the longitudinal rigidity of the top pillar section 3A and the bottom pillar section 3C. This makes it possible to more effectively exhibit the effects brought about by the thrusting out of the top pillar section 3A and the bottom pillar section 3C when external force is applied to the protruding section 3B.

Furthermore, the longitudinal rigidity of the bottom pillar section 3C is less than the longitudinal rigidity of the top pillar section 3A, the yield strength against the moment, which is generated in the top pillar section 3A and the bottom pillar section 3C and directed into the passenger compartment around the lengthwise direction of the vehicle, is greater than the moment M(z) generated in the top pillar section 3A and the bottom pillar section 3C when the maximum reaction force against the compressive force in the widthwise direction of the vehicle is applied to the protruding section 3B. Also the axial collapse strength of the bottom pillar section 3C in the longitudinal direction is set smaller than the longitudinal loads applied to the top pillar section 3A and bottom pillar section 3C when the maximum reaction force is generated. Therefore, when an extremely large impact load is applied during side impact, it is possible for the lower pillar end section of the center pillar 3 to collapse and be deformed in the axial direction before the protruding section 3B and the top and bottom pillar sections 3B and 3C of the center pillar 3 are locally deformed, making it possible for the beads 11a to better perform its function as a diffusing mechanism against localized deformation.

Also, the guide section 12 is fixedly supported on the floor cross member 5 of the floor section F, and the strength, in the vertical and widthwise directions of the vehicle, of the guide section 12 and of the floor cross member 5 on which the guide section 12 is fixedly supported is greater than the axial collapse strength of the bottom pillar section 3C in the longitudinal direction. Therefore, if an extremely large impact load is applied to the protruding section 3B of the center pillar 3 during side impact, the collapse force can be reliably supported in the vertical and left/right directions when the lower pillar end section of the center pillar 3 collapses in the axial direction and the center pillar 3 is displaced inward in the widthwise direction of the vehicle. Thus, the reaction force of the vehicle body is maintained and the penetration mode of the center pillar 3 is controlled in a more reliable and stable manner.

Second Embodiment

Figure 14:
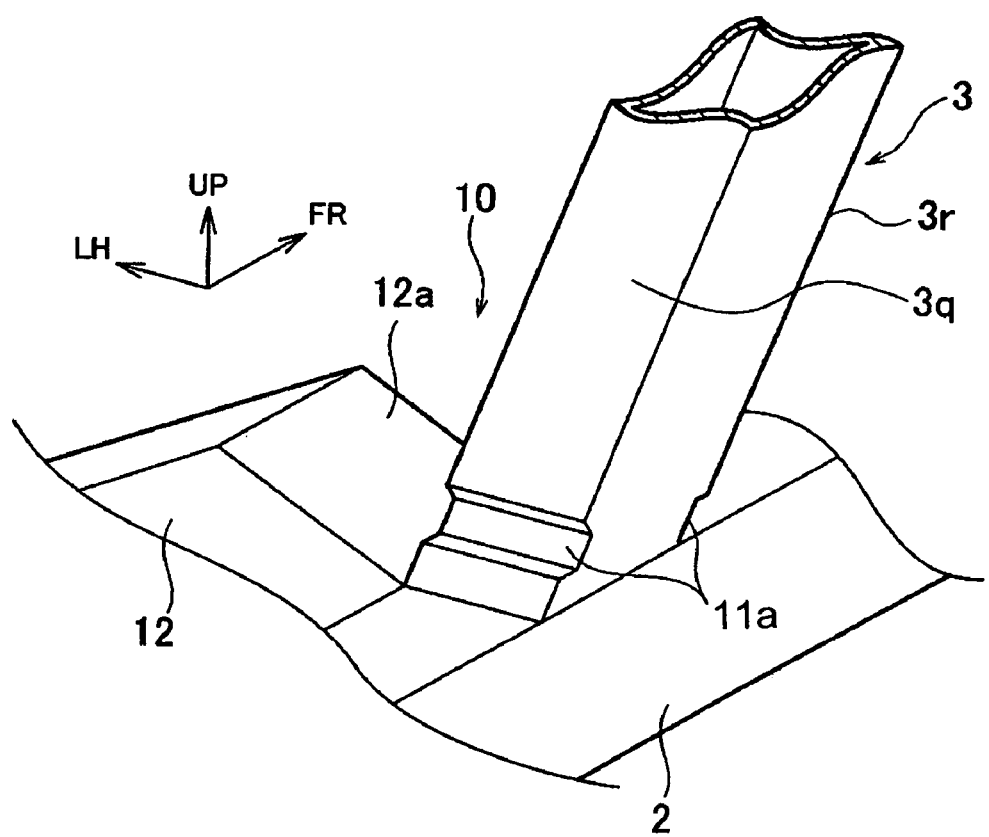
FIG. 14 is an enlarged partial perspective view of a deformable section disposed at a bottom end portion of the center pillar in accordance with a second embodiment of the present invention.

Referring now to FIG. 14, a vehicle body structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. FIG. 14 is a perspective view of a deformable section 11 provided to the lower pillar end section of a center pillar 3.

The vehicle body structure of the second embodiment has the beads 11a formed on the front and rear walls 3q and 3r of the lower pillar end section of the center pillar 3 as a deforming section, as shown in FIG. 14. Therefore, according to the second embodiment, essentially the same operational effects as the first embodiment are achieved, and since the beads 11a are provided on the front and rear walls 3q and 3r of the lower pillar end section of the center pillar 3, it is possible to adjust the axial collapse strength Fpeak of the lower pillar end section of the pillar 3 against longitudinal input without disrupting the behavior the center pillar 3 in response to transverse input.

Third Embodiment

Figure 15:
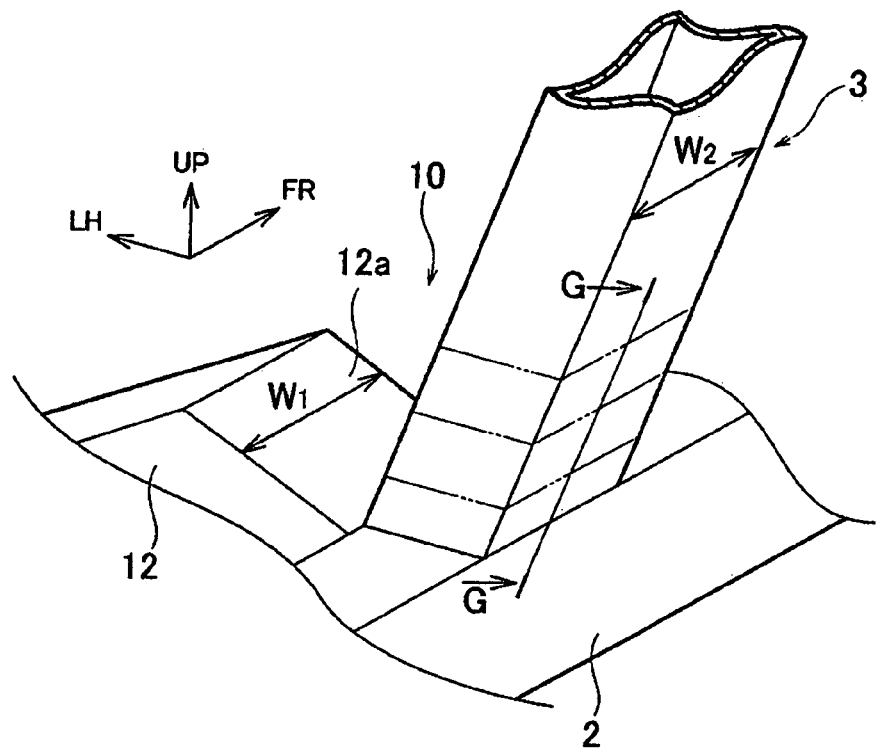
FIG. 15 is an enlarged partial perspective view of a deformable section disposed at a bottom end portion of the center pillar in accordance with a third embodiment of the present invention.
Figure 16:
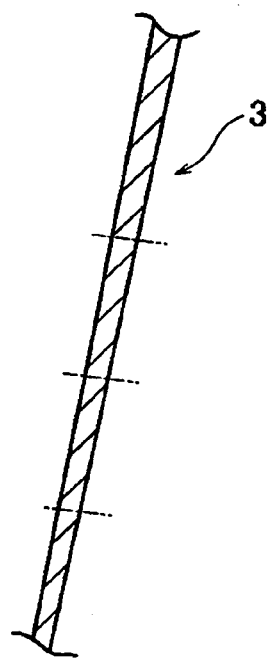
FIG. 16 is an enlarged partial cross-sectional view of bottom end portion of the center pillar along the section line G—G in FIG. 15.

Referring now to FIGS. 15 and 16, a vehicle body structure in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 15 is a perspective view of the lower pillar end section of the center pillar 3, while FIG. 16 is an enlarged cross-sectional view of the center pillar 3 as viewed along the section line G—G in FIG. 15. In the vehicle body structure of the third embodiment, the axial collapse strength increases in the longitudinal direction continuously or intermittently in the upward direction from the lowermost end connection to the side sills 2 of the center pillar 3 due to the formation of the center pillar 3 from a tailored blank material or other such material of varying thickness, as shown in FIGS. 15 and 16.

Also, the width W1 of the guide section 12 in the longitudinal direction of the vehicle body is greater than the width W2 of the lower pillar end section of the center pillar 3 in the longitudinal direction of the vehicle body.

Therefore, according to the third embodiment, essentially the same operational effects as the other embodiments are achieved. Since the axial collapse strength in the longitudinal direction increases continuously or intermittently in the upward direction from the lowermost end of the center pillar 3, a compressive force can be more reliably applied to the lower pillar end section of the center pillar 3 when the center pillar 3 enters the vehicle passenger compartment as the lower pillar end section of the center pillar 3 is deformed by a side impact. Thus the reaction force of the vehicle body is maintained and the penetration mode of the center pillar 3 is controlled in a more reliable and stable manner.

Also, since the width W1 of the guide section 12 in the longitudinal direction of the vehicle body is greater than the width W2 of the lower pillar end section of the center pillar 3 in the longitudinal direction of the vehicle body, the collapse reaction force can be reliably absorbed in a process in which the lower pillar end section of the center pillar 3 is gradually collapsed by the input of a side-impact load, allowing the operational effects of maintaining the reaction force of the vehicle body to be exhibited in a more reliable manner.

Fourth Embodiment

Figure 17:
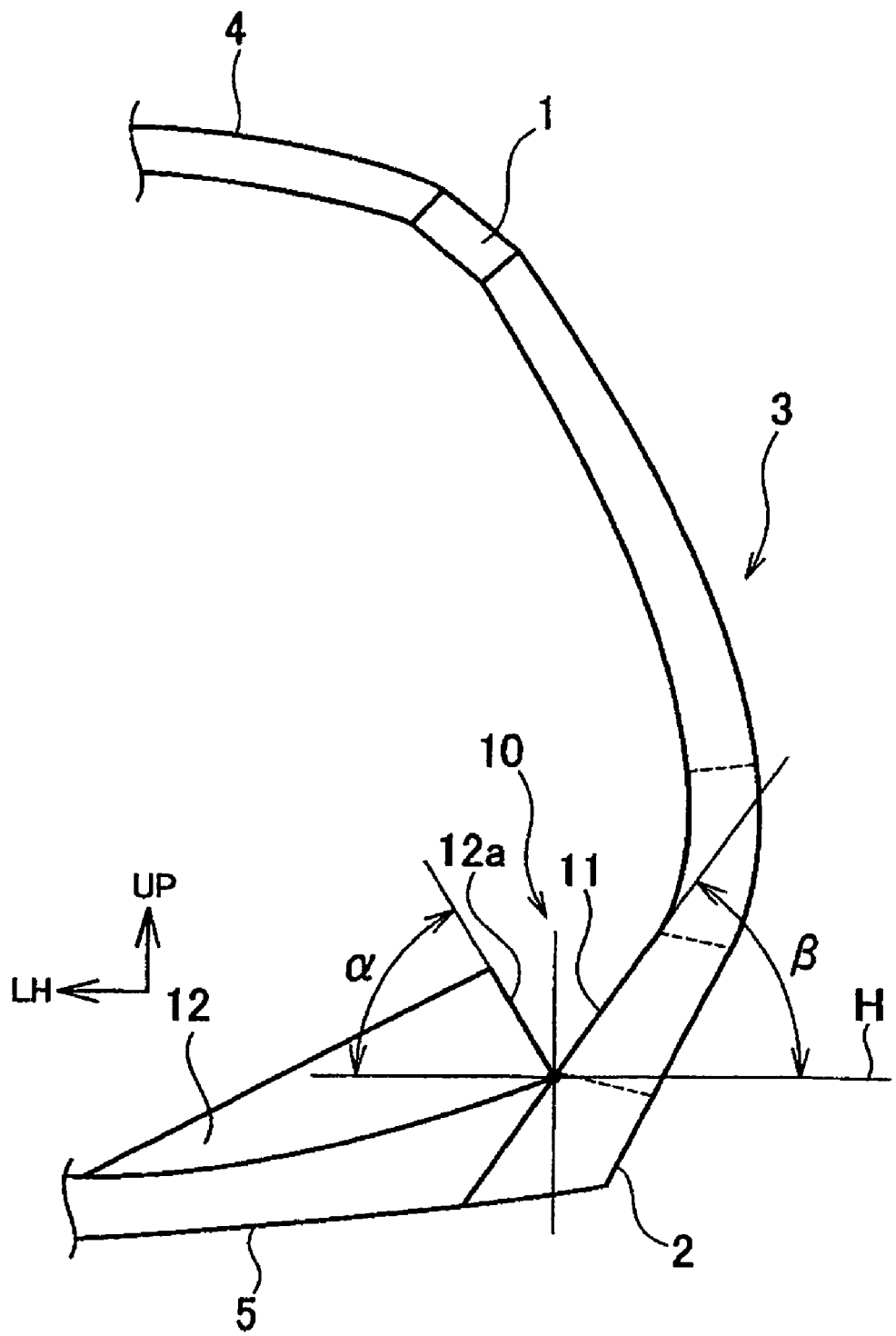
FIG. 17 is a simplified partial rear elevational view of one side of vehicle body frame showing the relationship between the center pillar and the guide section in accordance with a fourth embodiment of the present invention.
Figure 18:
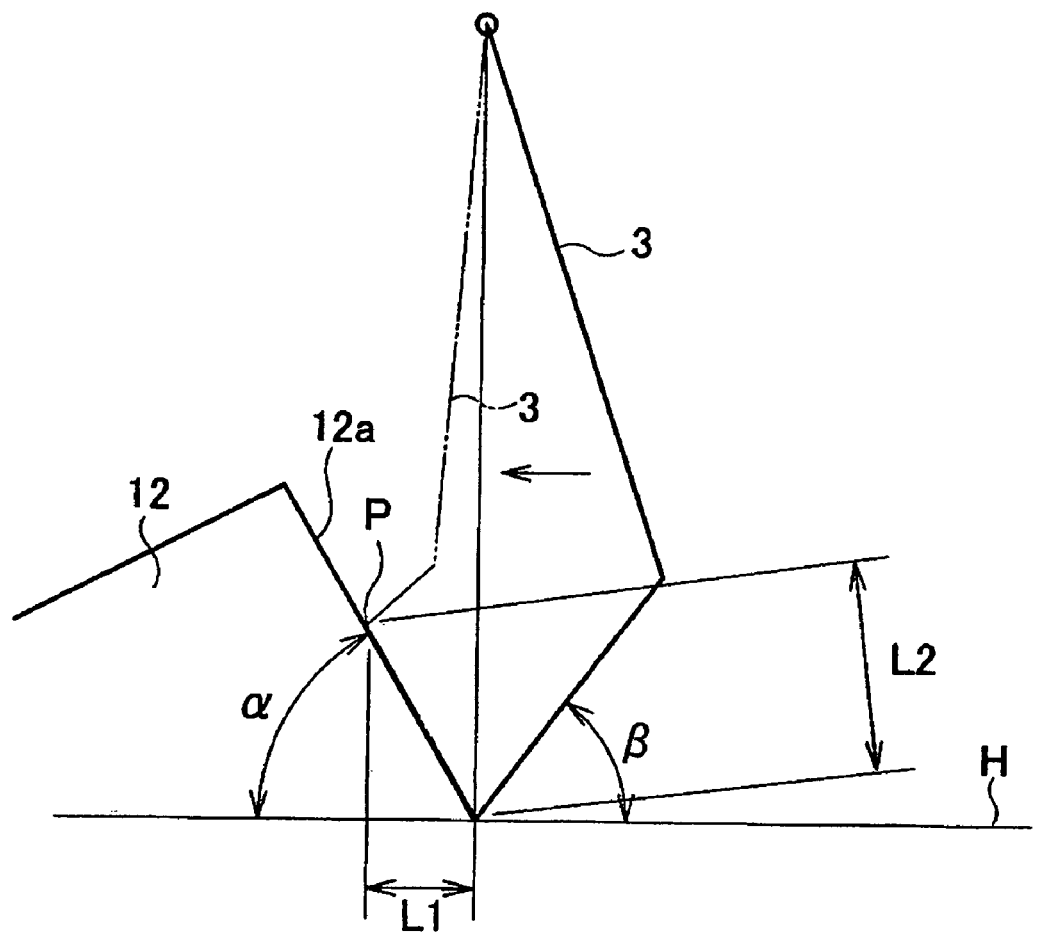
FIG. 18 is a simplified explanatory diagram of a simple geometric model of the deformation behavior of the center pillar in accordance with the fourth embodiment of the present invention.
Figure 19:
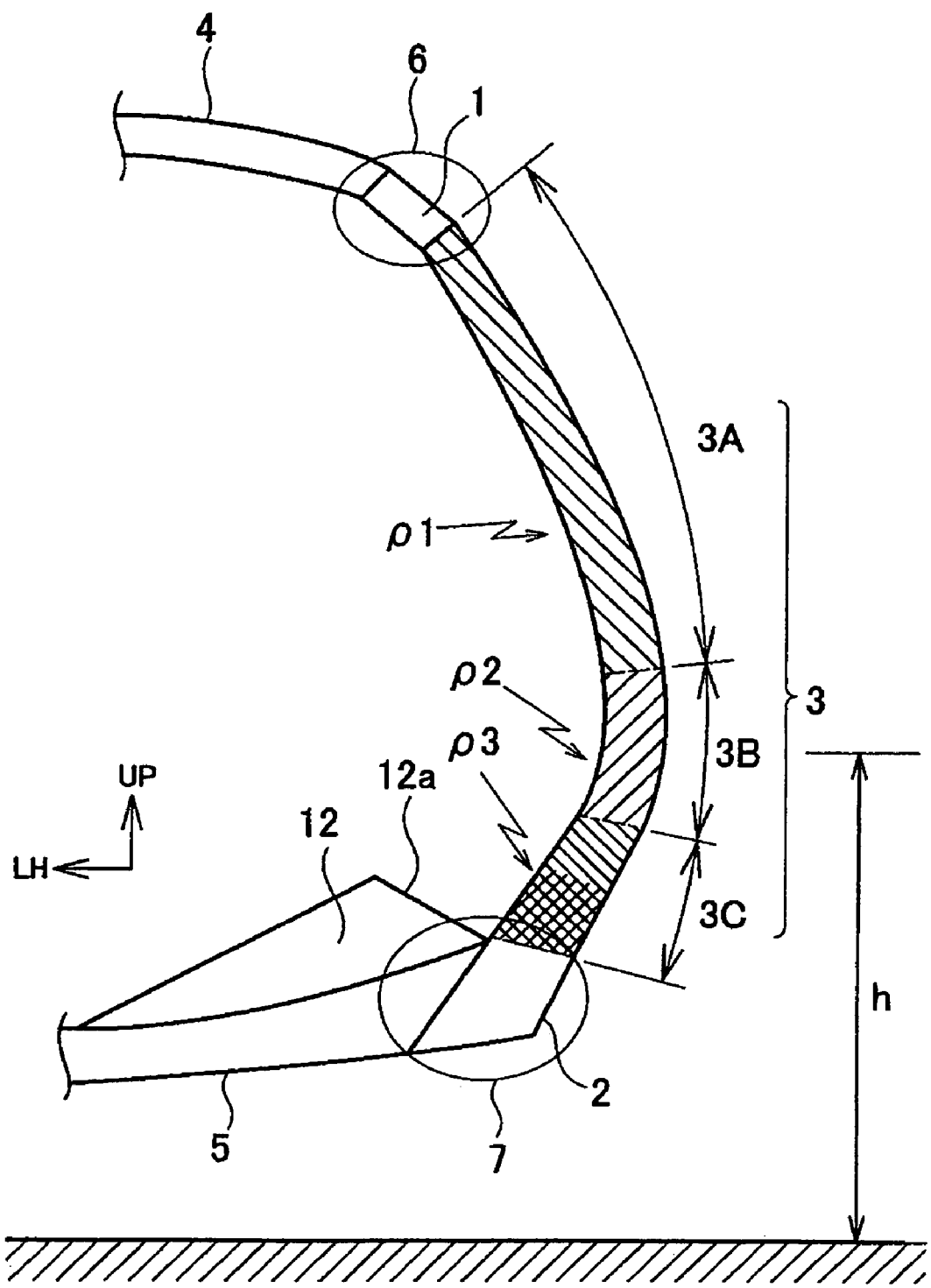
FIG. 19 is a simplified partial diagrammatic elevational view of the center pillar area on one side of vehicle body frame that is marked up to show the curvature relationship between the protruding section and the upper and lower sections of the center pillar, and the clearance of the protruding section in accordance with the fourth embodiment of the present invention.

Referring now to FIGS. 17–19, a vehicle body structure in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 17 is a rear view of the vehicle frame showing the relationship between the center pillar 3 and the guide section 12. FIG. 18 is an explanatory diagram showing a simple geometric model of the deformation behavior of the center pillar 3. FIG. 19 is an explanatory diagram showing the curvature relationship between the protruding section 3B and the upper and lower sections 3A and 3C of the center pillar 3, and the clearance h of the protruding section 3B relative to the ground.

In the vehicle body structure of the fourth embodiment, the guide surface 12a of the guide section 12 facing the center pillar 3 is inclined upward toward the center of the vehicle body so that the deforming bottom pillar section 3C presents an obstacle, and the angle of inclination α of the guide surface 12a in relation to the horizontal surface H of the vehicle body is greater than the angle of inclination β of the bottom pillar section 3C in relation to the horizontal surface H of the vehicle body, as shown in FIG. 17.

Also, the top pillar section 3A and the bottom pillar section 3C of the center pillar 3 curve at a constant curvature in the direction away from the vehicle passenger compartment. The radius of curvature ρ1 of the top pillar section 3A and the radius of curvature ρ3 of the bottom pillar section 3C are either substantially equal to each other (ρ1≈ρ3), or the radius of curvature ρ1 of the top pillar section 3A is less than the radius of curvature ρ3 of the bottom pillar section 3C (ρ1<ρ3). The radius of curvature ρ2 of the protruding section 3B is less than that of both the top pillar section 3A and the bottom pillar section 3C, as shown in FIG. 19. At the center point of the protruding section 3B, the clearance h of the protruding section 3B of the center pillar 3 is preferably set to about 400 mm to about 800 mm above the ground.

Therefore, according to the fourth embodiment, the angle of inclination α of the guide surface 12a of the guide section 12 in relation to the vehicle body horizontal surface H is greater than the angle of inclination β of the bottom pillar section 3C in relation to the vehicle body horizontal surface H. Thus, when the lower pillar end section of the center pillar 3 is deformed into the passenger compartment due to side impact as shown in FIG. 18, the lower end interferes with the guide surface 12a of the guide section 12 as the structure collapses in the axial direction, as shown by the two-dotted lines in the same diagram. The point of interference P moves up along the guide surface 12a, the amount of movement L1 into the passenger compartment due to the collapse is kept below the crushed amount L2 of the bottom pillar section 3C by adopting the relationship α≧β, and the axial collapse can be performed in a satisfactory manner.

This is because compressive force can be constantly applied to the lower pillar end section of the center pillar 3 when the lower pillar end section of the center pillar 3 undergoes deformation and the bottom pillar section 3C enters the vehicle passenger compartment. Thus, the reaction force of the vehicle body exerted when the load during impact increases can be more reliably maintained, and entrance into the vehicle passenger compartment can be suppressed while energy is absorbed.

Also, since the radius of curvature ρ1 of the top pillar section 3A and the radius of curvature ρ3 of the bottom pillar section 3C have a relationship of either ρ1≈ρ3 or ρ1<ρ3, and the radius of curvature ρ2 of the protruding section 3B is smaller than that of the top pillar section 3A and the bottom pillar section 3C, the center pillar 3 is formed into an approximate C shape with the protruding section 3B as its peak. Accordingly, the thrusting effects of the top pillar section 3A and bottom pillar section 3C at the start of impact can be made more prominent.

Furthermore, the clearance h of the protruding section 3B of the center pillar 3 is set to about 400 mm to about 800 mm, so when the colliding object is another vehicle, there is a high probability that the input from the bumper section of the other vehicle during side impact will be absorbed by the protruding section 3B. Thus, the reaction force of the vehicle body at the start of impact can be quickly generated in a more reliably manner.

Fifth Embodiment

Figure 20:
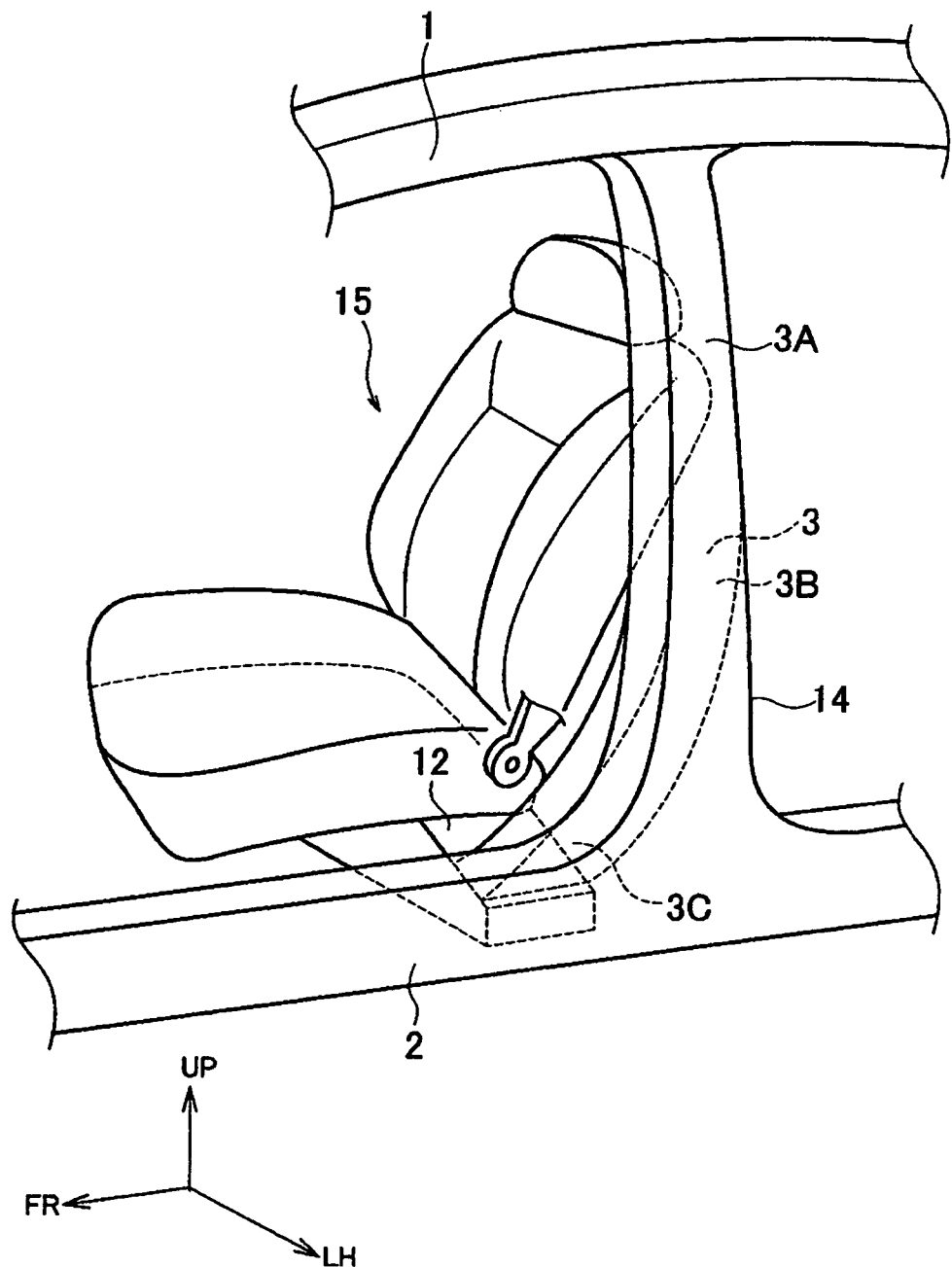
FIG. 20 is a partial perspective view of the center pillar area on one side of vehicle body frame in accordance with a fifth embodiment of the present invention.
Figure 21:
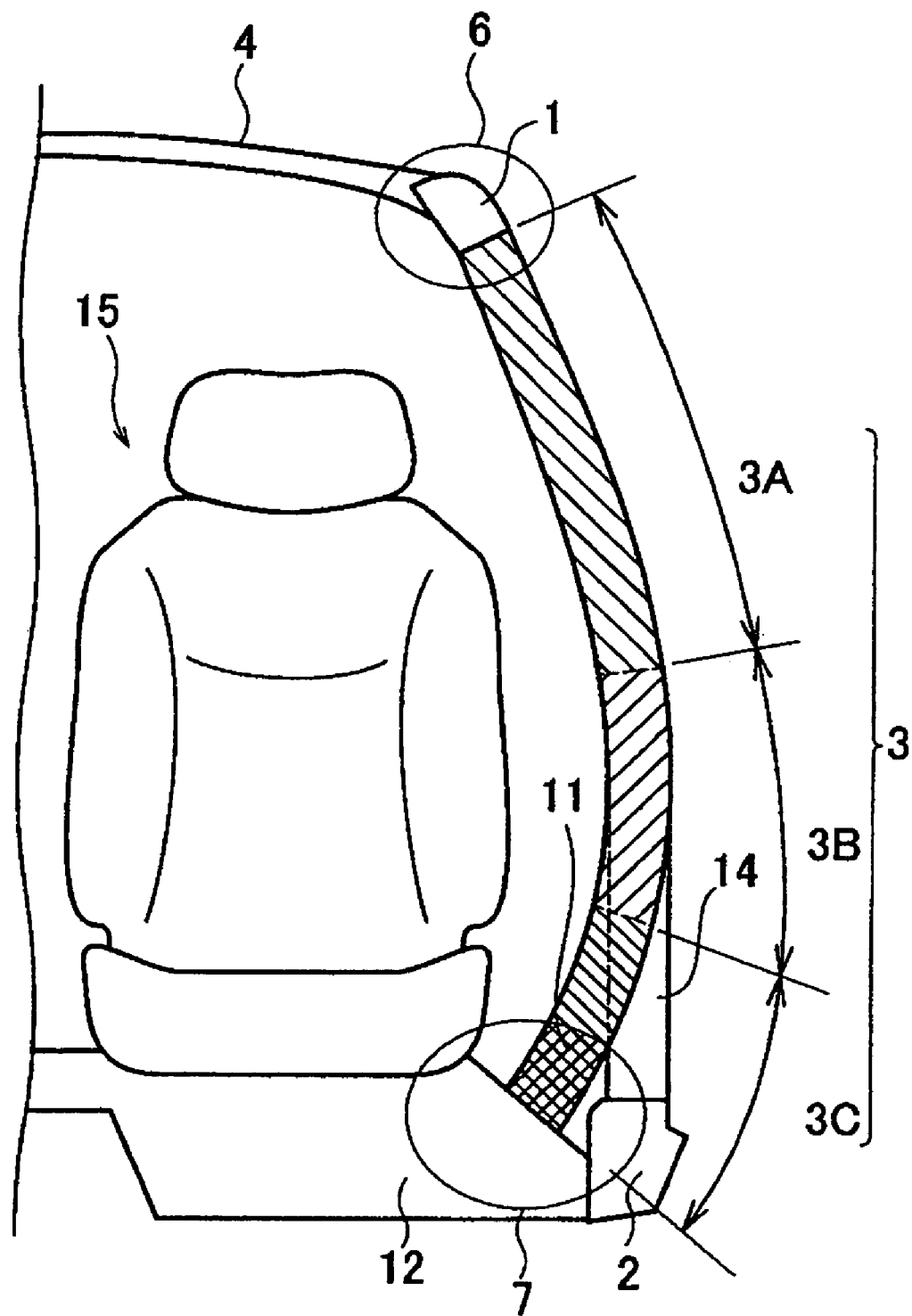
FIG. 21 is a partial front elevational view of one side of vehicle body frame including the center pillar area in accordance with the fifth embodiment of the present invention.

Referring now to FIGS. 20 and 21, a vehicle body structure in accordance with a fifth embodiment will now be explained. In view of the similarity between the fifth embodiment and the prior embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. FIG. 20 is a perspective view of a center pillar 3, while FIG. 21 is a front view of a center pillar 3.

In the vehicle body structure of the fifth embodiment, the center pillar 3 is provided with a second pillar (outer pillar element) 14. The pillars 3 and 14 are arranged in a forked configuration. In particular, the center pillar 3 and the second pillar 14 share at least the upper end thereof. Thus, the pillars 3 and 14 extend downward from the side roof rails 1 substantially perpendicular as seen from the side, and connect to the side sills 2, as shown in FIGS. 20 and 21.

In other words, the center pillar 3 is formed to curve into the vehicle passenger compartment from the protruding section 3B to the bottom pillar section 3C, and the lower end thereof is connected to the floor cross member 5 at the guide section 12 in the present embodiment, while the second pillar 14 extends downward in a substantially perpendicular manner from the area near the protruding section 3B of the center pillar 3, and the lower pillar end section thereof is connected to the side sills 2, as shown in FIG. 20.

Also, a seat 15 is mounted on the guide section 12 in the present embodiment.

Therefore, according to the fifth embodiment, the same operational effects are achieved as in the first embodiment. By providing the second pillar 14 as a cover, the outer surface of the vehicle body can be changed. Thus, the bottom pillar section 3C of the center pillar 3 is still curved into the vehicle passenger compartment. In other words, this arrangement makes it possible to minimize the effect of the overall shape of the center pillar 3, on the exterior design of the vehicle body. For this reason, greater freedom is achieved in terms of vehicle design, and both the commercial value and impact performance can be improved.]

Sixth Embodiment

Referring now to FIGS. 22–29, a vehicle body structure in accordance with a sixth embodiment will now be explained. In view of the similarity between the sixth embodiment and the prior embodiments, the descriptions of the parts of the sixth embodiment that are identical to or substantially identical to the parts of the first embodiment may be omitted for the sake of brevity.

Figure 22:
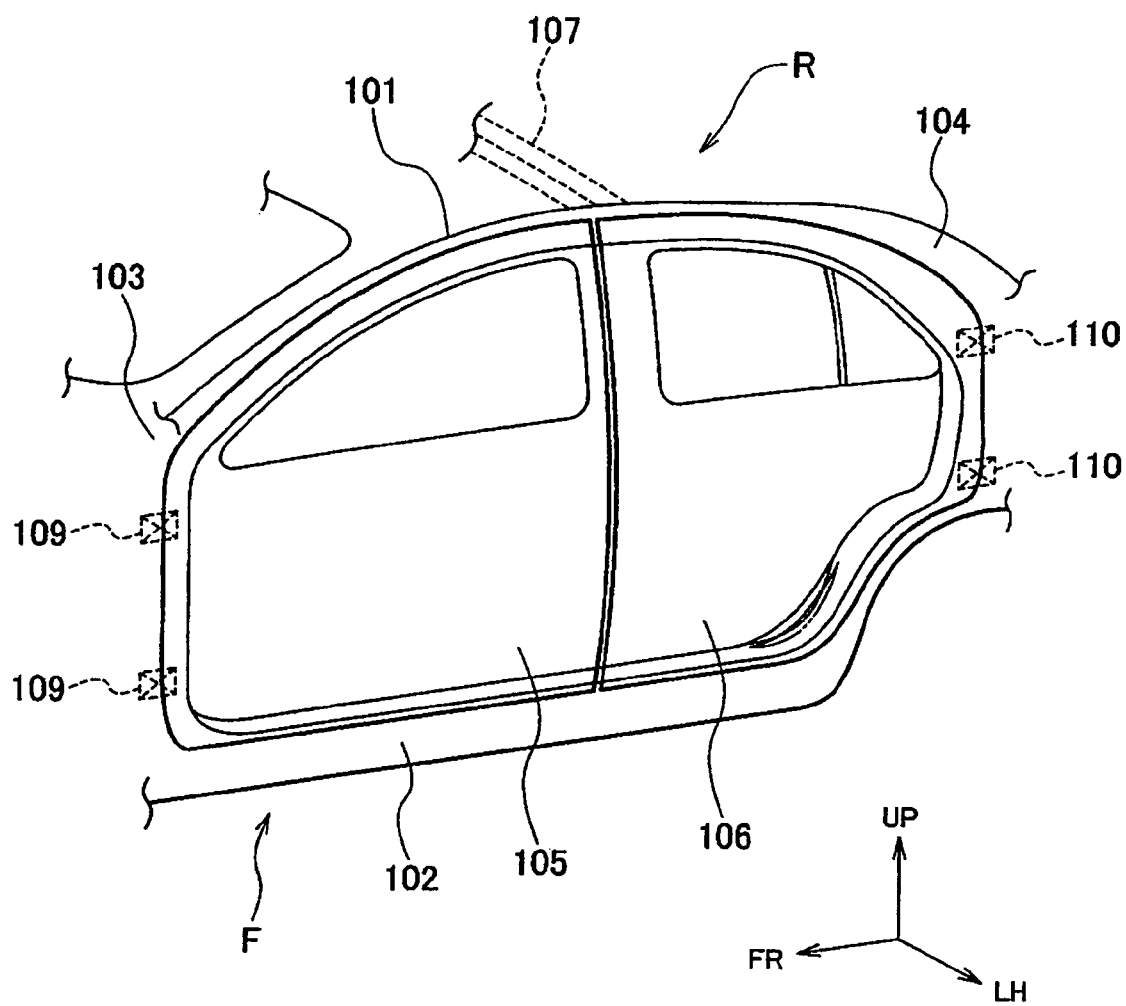
FIG. 22 is a partial perspective view of one side of vehicle body frame showing a door arrangement in accordance with a sixth embodiment of the present invention.
Figure 23:
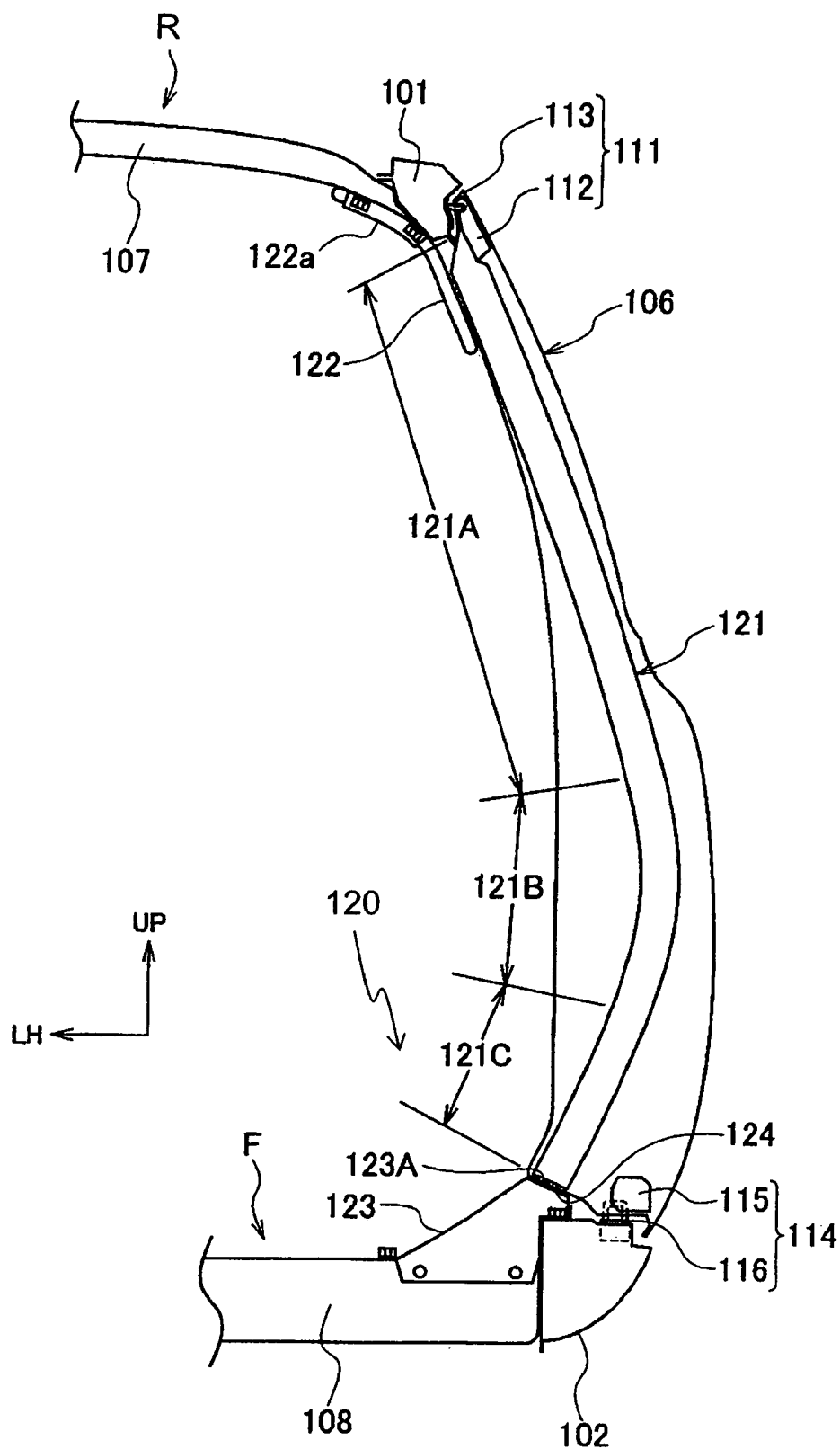
FIG. 23 is a cross-sectional view of the vehicle body frame showing an internal pillar member arrangement in a rear door in accordance with the sixth embodiment of the present invention.
Figure 24:
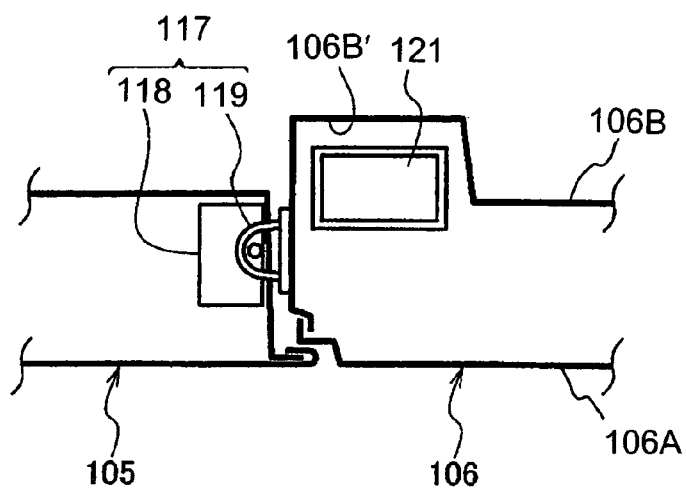
FIG. 24 is a simplified partial diagrammatic cross-sectional view of the mating area between the rear door and the front door in accordance with the sixth embodiment of the present invention.
Figure 25:
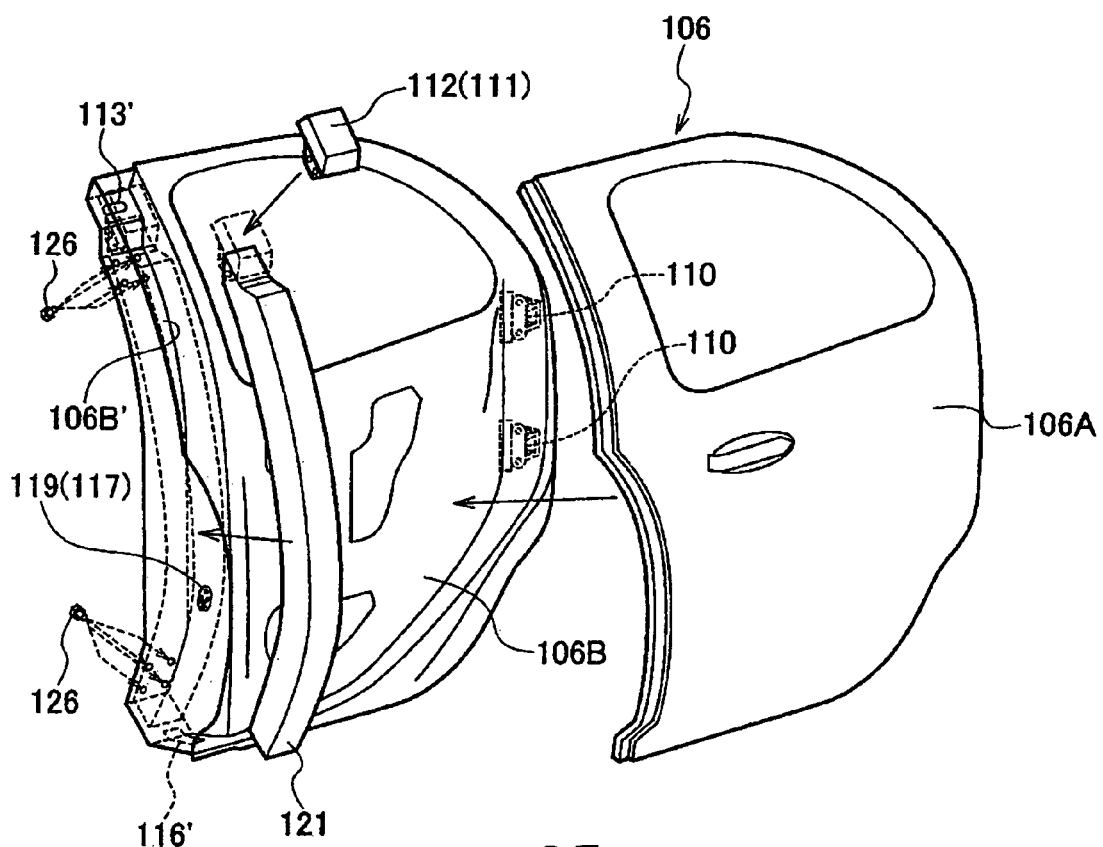
FIG. 25 is an exploded perspective view of a rear door in accordance with the sixth embodiment of the present invention.
Figure 26:
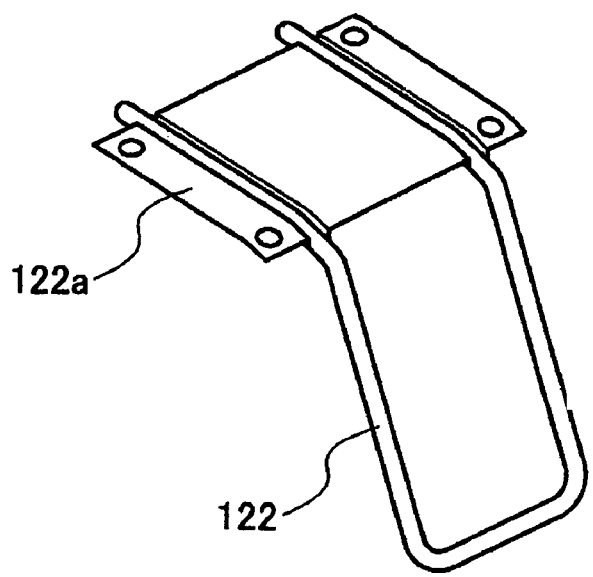
FIG. 26 is a perspective view of the upper frame member used in the vehicle body frame in accordance with the sixth embodiment of the present invention.
Figure 27:
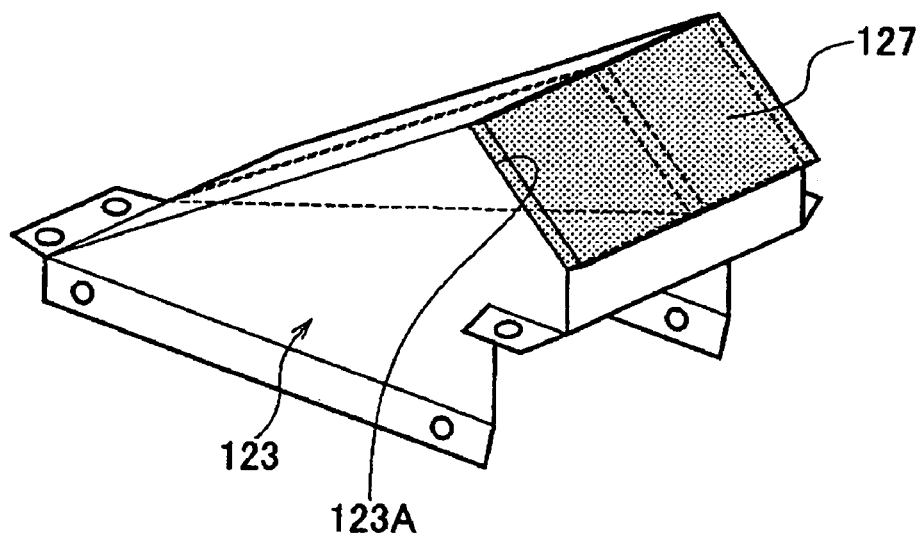
FIG. 27 is a perspective view of the lower frame member used in the vehicle body frame in accordance with the sixth embodiment of the present invention.
Figure 28:
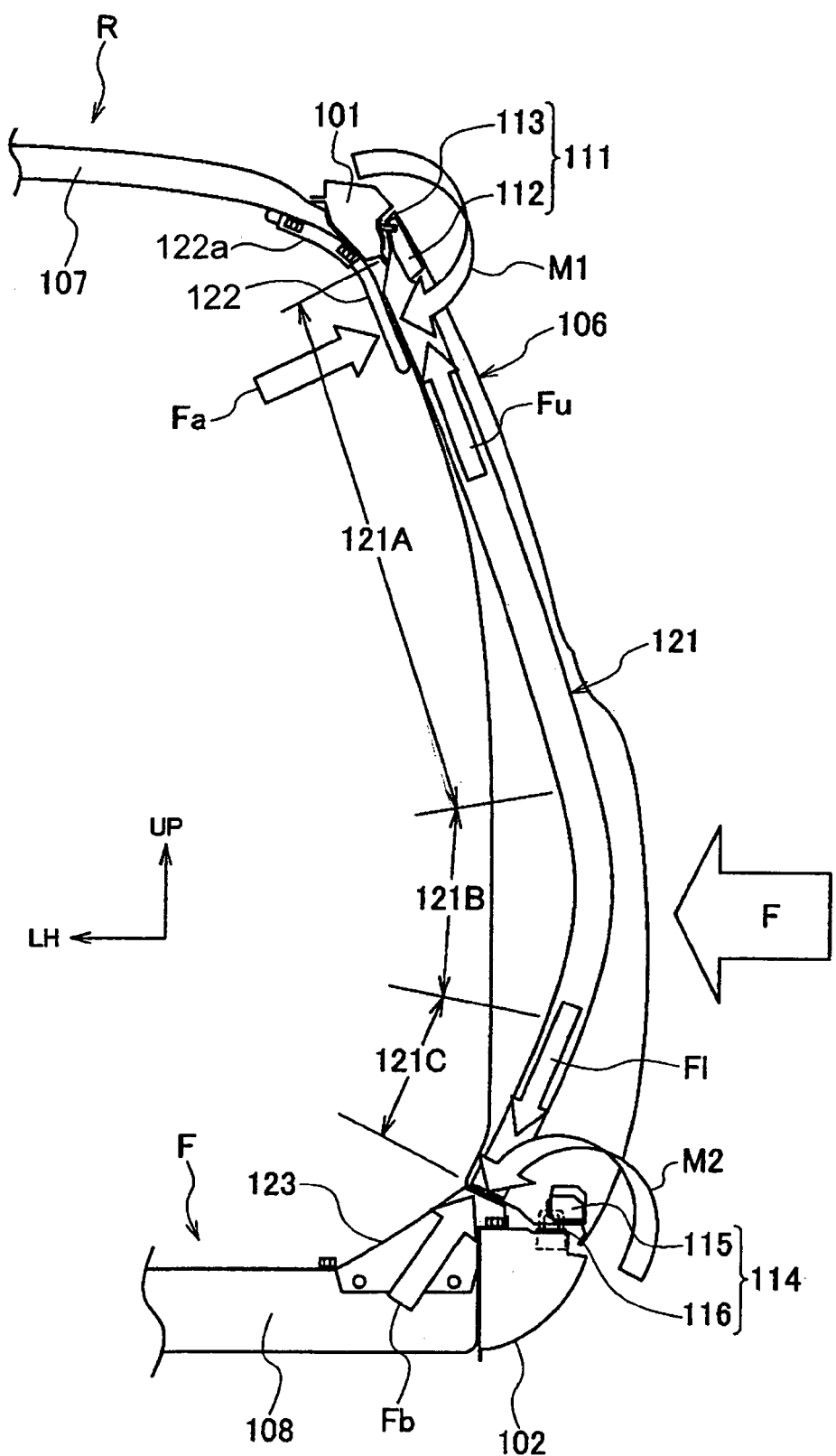
FIG. 28 is a simplified partial diagrammatic cross-sectional view depicting the operation of the internal pillar member in accordance with the sixth embodiment of the present invention.

FIG. 22 is a perspective view showing a door arrangement. FIG. 23 is a cross-sectional view showing the internal pillar member arrangement in a rear door. FIG. 24 is a cross-sectional view of the mating abutment area of the rear door and the front door. FIG. 25 is an exploded perspective view of the rear door. FIG. 26 is a perspective view of the upper frame member. FIG. 27 is a perspective view of the lower frame member. FIG. 28 is a cross-sectional view depicting the operation of the internal pillar member. FIG.

29 is an explanatory diagram of a mechanism of generating a moment of internal force applied to the curved area of the internal pillar member.

The vehicle body structure of the sixth embodiment basically includes a pair of left and right side roof rails 101, a pair of left and right side sills 102, a front pillar 103, a rear pillar 104, a front door 105, a rear door 106, a roof cross member 107 and a floor cross member 108. The left and right side roof rails 101 extend forward and backward along the vehicle body on both sides of the roof section R in the widthwise direction of the vehicle. The left and right side sills 102 extend forward and backward along the vehicle body on both sides of the floor section F in the widthwise direction of the vehicle. The front and rear pillars 103 and 104 are configured and arranged for connecting the side roof rails 101 and the side sills 102 together in the vertical direction of the vehicle body. The front and rear doors 105 and 106 are configured and arranged to freely open and close in a vehicle-body opening section enclosed by the side roof rails 101, the side sills 102, the front pillar 103, and the rear pillar 104. The front and rear doors 105 and 106 are disposed to provide a close match in the front and back of the vehicle body opening section. The roof cross member 107 is configured and arranged for connecting the side roof rails 101 at nearly matching positions of the front door 105 and the rear door 106 in the widthwise direction of the vehicle. The floor cross member 108 is configured and arranged for connecting the side sills 102 at nearly matching positions of the front door 105 and the rear door 106 in the widthwise direction of the vehicle, as shown in FIG. 22.

The front door 105 is mounted to freely open and close on the front pillar 103 via upper and lower door hinges 109 at the front end thereof, while the rear door 106 is mounted to freely open and close on the rear pillar 104 via upper and lower door hinges 110 on the back end thereof.

Also, the rear door 106 is adapted to be connected to the side roof rails 101 by an upper door locking device 111 and side sills 102 by a lower door locking device 114. Specifically, the upper end portion of the front end of the rear door 106 the upper door locking device 111 includes a door lock mechanism 112 and a striker 113 provided next to the side roof rails 101 for interlocking with the door lock mechanism 112. The lower door locking device 114 includes a door lock mechanism 115 provided on the door side to the lower end portion of the front end of the door 106 and a striker 116 provided next to the side sill 102 for interlocking with the door lock mechanism 115, as shown in FIG. 23.

Also, the front door 105 is adapted to be connected to the front end of the rear door 106 by a door locking device 117. The door locking device 117 includes a door lock mechanism 118 and a striker 119. The door lock mechanism 118 is provided on the side of the front door 105 at the lower middle portion of the back end of the door 105. The striker 119 is provided on the side of the rear door 106 for interlocking with the door lock mechanism 118, as shown in FIG. 24.

An input conversion structure 120 is also provided at the point where a side-impact input is applied inward to either the front door 105 or the rear door 106. In other words, as in the illustrated embodiment, the input conversion structure 120 is provided at the front end of the rear door 10*b* such that a side-impact input in a substantially horizontal direction from the vehicle exterior is converted/maintained as input that is applied to the front end of the door 10*c* in the vertical direction of the vehicle body. Thus, the side-impact input is transmitted to the side roof rails 101 and side sills 102.

The input conversion structure 120 includes an internal pillar member 121 disposed extending vertically between the top and bottom ends in the front end section of the rear door 106, the upper and lower door locking devices 111 and 114 located near the upper and lower pillar end sections of the internal pillar member 121, and upper and lower reaction force generating members 122 and 123. The upper and lower reaction force generating members 122 and 123 are provided respectively to the side roof rails 101 and the side sills 102 and designed to suppress the rotation moments generated in the upper and lower pillar end sections of the internal pillar member 121 and directed into the vehicle passenger compartment.

The internal pillar member 121 is configured with a rectangular closed cross-sectional structure composed of a steel or a lightweight metal casting. The internal pillar member 121 is formed into an overall approximate C shape by gently curving the upper portion 121A and lower portion 121C thereof, such that the protruding section 121B protrudes outward the farthest portion, which is subjected to the action of the side-impact load. For example, the protruding section 121B is disposed at a vertical position whose height substantially corresponds to the clearance of the front bumper of the other vehicle involved in the side impact.

FIGS. 24 and 25 show the rear door 106 separated into an outer panel 106A and an inner panel 106B, wherein the internal pillar member 121 is accommodated in a concave section 106B' formed vertically in the front end of the inner panel 106B, the upper and lower ends thereof are securely fixed in the lateral surface of the inner panel 106B by bolts 126, and the internal pillar member 121 is disposed on substantially the same line as the roof cross member 107 and the floor cross member 108 in the widthwise direction of the vehicle.

Also in the present embodiment, the door lock mechanism 112 of the upper door locking device 111 is securely fixed to the top end of the internal pillar member 121 by bolts and nuts or the like, and the striker 113 is designed to interlock with the door lock mechanism 112 via a striker inlet hole 113' formed in the upper end of the concave section 106B'.

The door lock mechanism 115 of the lower door locking device 114 is fixed secured on the substantially horizontal surface near the external side of the vehicle at the lower end of the concave section 106B' and is arranged at a location in the external side of the vehicle distanced from the lower pillar end section of the internal pillar member 121. The striker 116 is designed to interlock with the door lock mechanism 115 via a striker inlet hole 116' formed extending between the nearly flat surface section and an inclined contact surface 124 to be hereinafter described.

The upper reaction force generating member 122 is configured from an approximately U-shaped upper frame member joined across the roof cross member 107 and the side roof rails 101 through a base plate 122*a* as shown in FIG. 26. This u-shaped upper frame member is mounted vertically from the side roof rails 101 along the inner surface of the top end of the door 106 so as to be capable of pressing against the region of the inner surface of the top end of the door 106 that corresponds with the internal pillar member 121 when the rear door 106 is closed.

The lower reaction force generating member 123 is configured from a box-shaped lower frame member joined across the side sills 102 and the floor cross member 108. The lower frame (reaction force generating) member 123 is formed as an inclined surface so that the surface on the side of the vehicle passenger compartment is connected to the top surface of the floor cross member 108 and the surface of the inner panel 106B of the rear door 106 in a planar arrangement. A load bearing surface 123a is formed at the top so as to press substantially perpendicularly against the contact surface 124, which corresponds to the lower surface of the internal pillar member 121 in the bottom surface of the lower end of the door. The load bearing surface 123a and the contact surface 124 are formed as inclined surfaces that are inclined externally downward in the widthwise direction of the vehicle. Also, the load bearing surface 123a is provided with an elastic body 127 made of rubber or the like, as shown in FIG. 27, that is compressed by the contact surface 124 when the rear door 106 is closed.

According to the vehicle body structure of this embodiment thus configured, the internal pillar member 121 is arranged in the front end of the rear door 106 and curves in an approximate C shape from the upper portion 121A to the lower portion 121C, such that the curve peaks at the protruding section 121B. The top end of the upper portion 121A is connected to the side roof rails 101 of the roof frame by the high-rigidity upper door locking device 111, while the lower end of the door 106 near the lower end of the lower portion 121C is connected to the side sills 102 of the floor frame by the door locking device 114. Thus, the internal pillar member 121 is supported by the side roof rails 101 and side sills 102. At the start of the side impact shown in FIG. 28, therefore, the impact load F is absorbed by the protruding section 121B, and then the internal pillar member 121 is thrusted upwardly and downwardly through the upper and lower ends, whereby the reaction force of the vehicle body at the start of impact is generated more quickly and deformation of the vehicle body is suppressed even in a vehicle with no center pillar.

Figure 29:
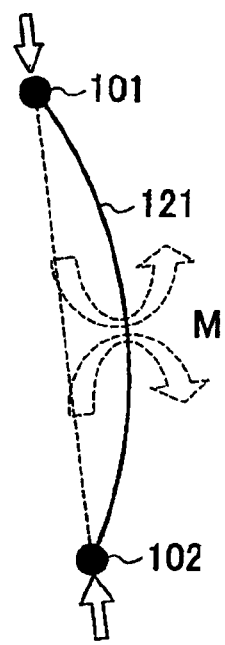
FIG. 29 is an explanatory diagram of a mechanism of generating a moment of internal force applied to the curved area of the internal pillar member in accordance with the sixth embodiment of the present invention.

Also, in order for the internal pillar member 121 to curve between the upper and lower ends, a moment M that forms an outward convexity in the widthwise direction of the vehicle is induced as internal force, as shown in FIG. 29, when compressive force is applied in the longitudinal direction. This moment M is applied in the opposite direction from the moment of external force applied by the impact load during side impact so that the internal pillar member 121 forms an inward convexity in the widthwise direction of the vehicle. Therefore, canceling out the moment of external force makes it possible to reduce the load applied to the internal pillar member 121 due to the impact load. Consequently, this makes it possible to improve and maintain the reaction force of the vehicle body against the impact load F in a more efficient manner.

In other words, since the side-impact load F is converted/maintained as input that is applied to the internal pillar member 121 in the vertical direction of the vehicle body by the input conversion structure 120 and that is transmitted to the side roof rails 101, roof cross member 107, the side sills 102, and the floor cross member 108, the input can be absorbed as a compression load in the longitudinal direction of the internal pillar member 121 in the front end of the rear door 106 in the matching section of the rear door 106 and the front door 105. Moreover, the amount of deformation of the matching section into the vehicle passenger compartment can be suppressed, even in a vehicle with no center pillar.

In the present embodiment, the input conversion structure 120 is configured from the outward curving internal pillar member 121, the upper and lower door locking devices 111 and 114, and the upper and lower reaction force generating members 122 and 123 provided to the side roof rails 101 and side sills 102, respectively. Thus, the input conversion structure 120 is designed to suppress the rotation moments M1 and M2 generated toward the vehicle passenger compartment in the upper and lower ends of the internal pillar member 121. Therefore, the impact load F during side impact is absorbed by the protruding section 121B of the internal pillar member 121, which is thrusted through the area occupied by the upper door locking device 111 due to the longitudinal load Fu applied to the upper portion 121A. Also the rotation moment M1 generated inward around the upper door locking device 111 is absorbed by the upper reaction force generating member 122 such that the rotation moment M1 is minimized. At the same time, the lower door locking device 114 and the lower reaction force generating member 123 are thrust out due to the longitudinal load F1 applied to the lower portion 121C. Thus, the rotation moment M2 generated inward around the lower door locking device 114 is absorbed by the lower reaction force generating member 123 such that the rotation moment M2 is minimized. Accordingly, the reaction force of the vehicle body at the start of impact is generated more quickly.

Also, the upper reaction force generating member 122 is joined across the roof cross member 107 and the side roof rails 101 through a base plate 122a. The upper reaction force generating member 122 is configured from an upper frame member that presses against the region on the inner surface of the top end of the door that corresponds with the internal pillar member 121. Thus, the force of the rotation moment M1 is absorbed by the side roof rails 101 and the roof cross member 107, making it possible to reliably generate a reaction force Fa in a direction that cancels out the rotation moment M1.

The lower reaction force generating member 123 is joined across the side sills 102 and the floor cross member 108. Also the lower reaction force generating member 123 is configured from a lower frame member having a load bearing surface 123a in a substantially perpendicular contact with the contact surface 124 corresponding to the lower surface of the internal pillar member 121 in the bottom surface in the lower end of the door 106. Thus, the longitudinal load F1 and the force of the rotation moment M2 are absorbed by the side sills 102 and the floor cross member 108, making it possible to reliably generate a reaction force Fb in a direction that cancels out these inputs.

Also, since the load bearing surface 123a of the lower reaction force generating member 123 and the contact surface 124 corresponding thereto are inclined downward and outside in the widthwise direction of the vehicle, and the load bearing surface 123a is provided with an elastic body 127 that is compressed by the contact surface 124 when the rear door 106 is closed, it is possible to reduce the distance of unimpeded motion traveled by the internal pillar member 121 before the rotational motion of the lower portion 121C is restrained, and to suppress the generation of low-level noise due to the interference of the contact surface 124 and the load bearing surface 123a when the vehicle is moving.

Figure 30:
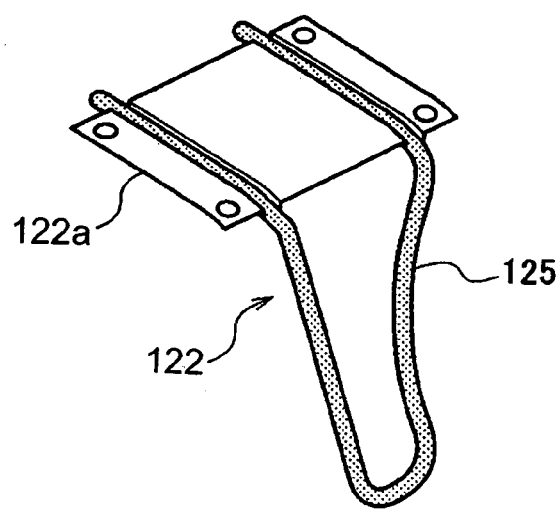
FIG. 30 is a perspective view showing a modification of the upper frame member used in the vehicle body frame in accordance with a modified sixth embodiment of the present invention.

FIG. 30 shows a modification of the upper frame member 122 in this sixth embodiment. In this modification, the rear portion of the approximately U-shaped upper frame member 122 is formed in a curved shape easily grasped by backseat passengers. Thus the surface of the member 122 is coated with rubber, a synthetic resin, or other material such as a resin material 125. Therefore, according to this modification, the rear portion of the upper frame member 122 is effectively utilized as an assist grip for the backseat passengers, which can be convenient when entering and exiting the vehicle.

Seventh Embodiment

Figure 31:
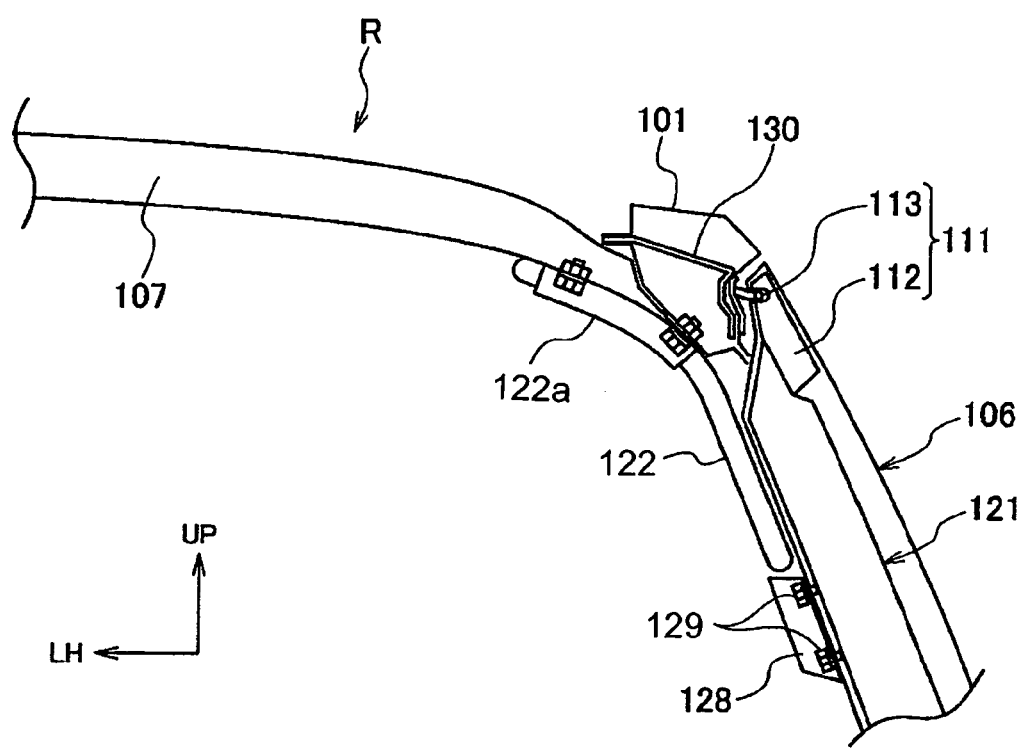
FIG. 31 is an enlarged view of the mounting area of the upper frame member used in the vehicle body frame in accordance with a seventh embodiment of the present invention.

Referring now to FIG. 31, a vehicle body structure in accordance with a seventh embodiment will now be explained. In view of the similarity between the seventh embodiment and the sixth embodiment, the parts of the seventh embodiment that are identical to the parts of the sixth embodiment will be given the same reference numerals as the parts of the sixth embodiment. Moreover, the descriptions of the parts of the seventh embodiment that are identical to the parts of the sixth embodiment may be omitted for the sake of brevity. FIG. 31 is an enlarged view of the mounting area of the upper frame member 122.

In the seventh embodiment, a protruding member 128 consisting of a metal block is configured and arranged to interlock with the lower end of the upper frame member 122 in the vertical direction during deformation of the internal pillar member 121. The protruding member 128 is mounted on the inner surface of the upper end of the front end of the rear door 106 and joined to the internal pillar member 121 by bolts 129.

Also in the present embodiment, a reinforcing element 130 is mounted on the side roof rails 101 to add stiffness to the mounting area of the striker 113 the reinforcing element 130 extends between the side roof rails 101 in the widthwise direction of the vehicle such that its ends are joined across the area containing the striker 113.

Consequently, in accordance with the present embodiment, the tensile force exerted on the mounting area of the striker 113 by the rotation moment M1 can be efficiently transmitted by the reinforcing element 130 to the upper side of the side roof rails 101. Also the deformation in the mounting area of the striker 113 can be reduced while the protruding member 128 interlocks with the lower end of the upper frame member 122. Thus the reaction force of the upper frame member 122 can be enhanced when a compression load acts on the internal pillar member 121 in the longitudinal direction.

Eighth Embodiment

Referring now to FIGS. 32–35, a vehicle body structure in accordance with an eighth embodiment will now be explained. In view of the similarity between the eighth embodiment and the sixth and seventh embodiments, the parts of the eighth embodiment that are identical to the parts of the sixth and seventh embodiments will be given the same reference numerals as the parts of the sixth and seventh embodiments. Moreover, the descriptions of the parts of the eighth embodiment that are identical to the parts of the sixth and seventh embodiments may be omitted for the sake of brevity.

Figure 32:
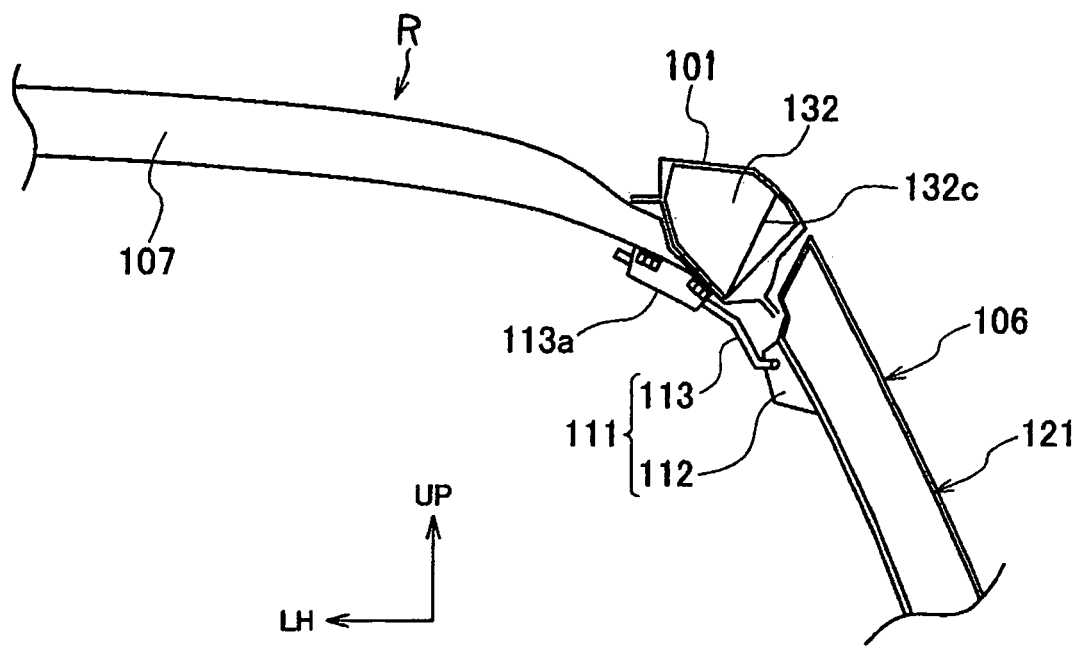
FIG. 32 is an enlarged view of the area of the vehicle body frame in which the upper door locking device is disposed in accordance with an eighth embodiment of the present invention.
Figure 33:
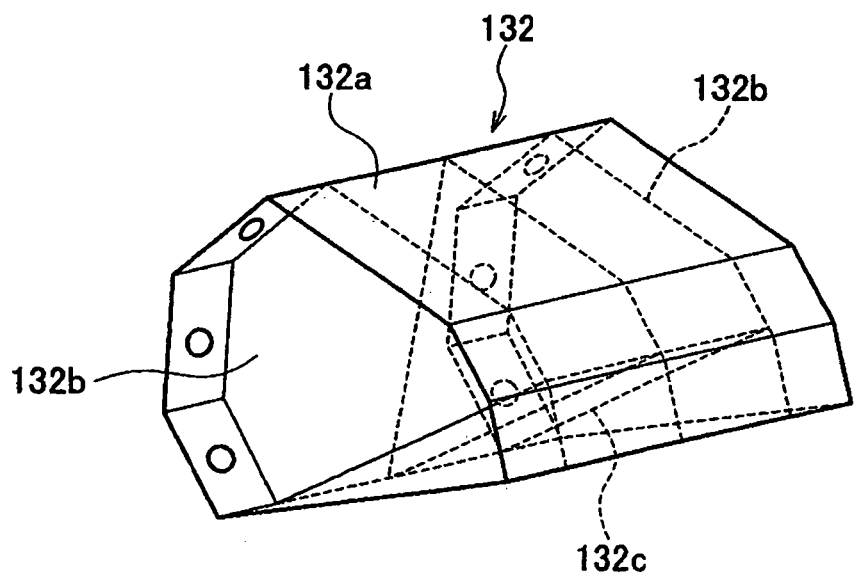
FIG. 33 is a perspective view showing the load-bearing member used in the vehicle body frame in accordance with the eighth embodiment of the present invention.
Figure 34:
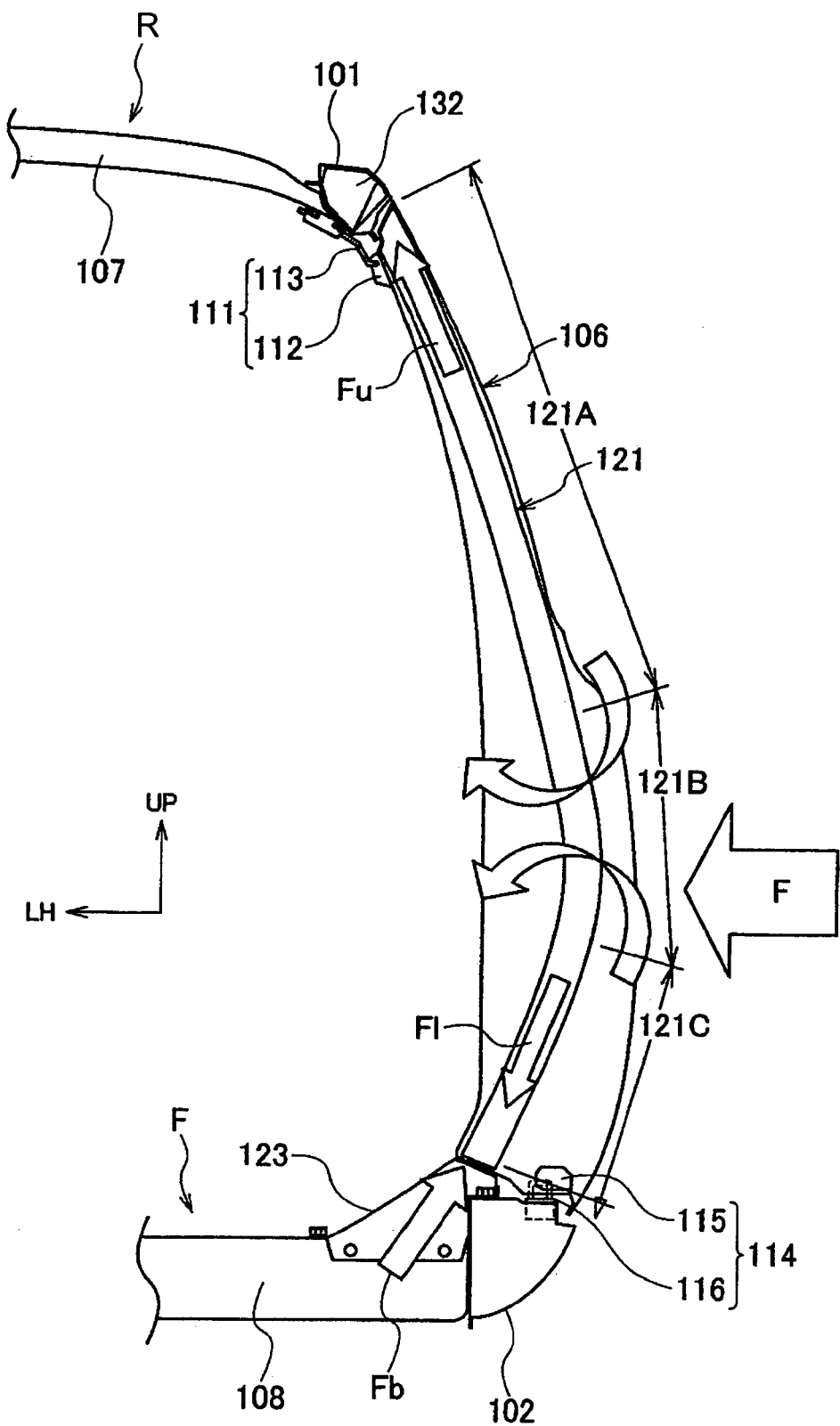
FIG. 34 is a cross-sectional view depicting the operation of the inner pillar member in accordance with the eighth embodiment of the present invention.
Figure 35:
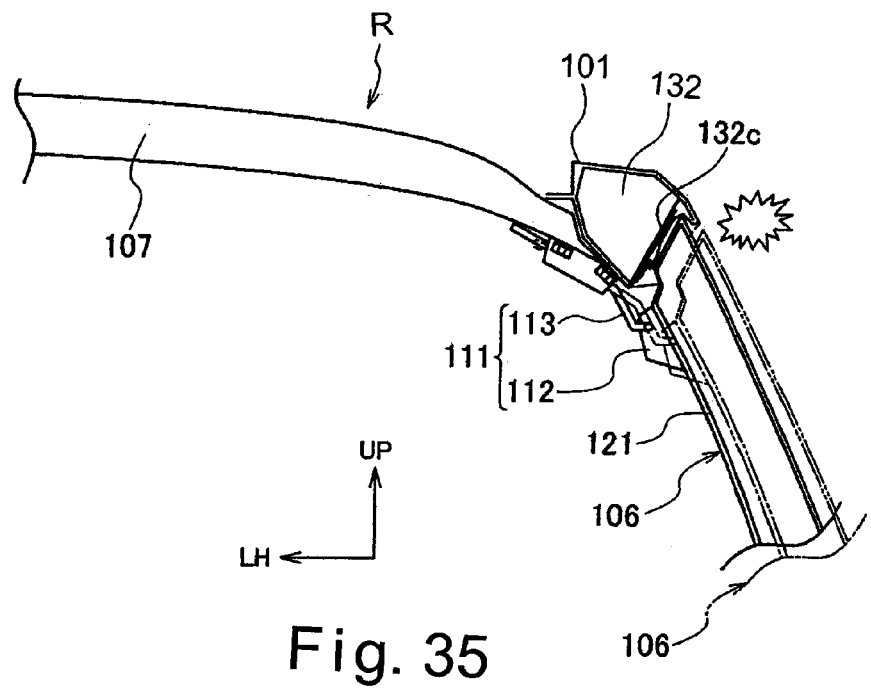
FIG. 35 is an enlarged view showing the inner pillar member of the vehicle body frame after being displaced upward in accordance with the eighth embodiment of the present invention.

FIG. 32 is an enlarged view showing the area in which the upper door locking device 111 is disposed. FIG. 33 is a perspective view of the load-bearing member mounted between the side roof rails. FIG. 34 is a cross-sectional view depicting the operation of the inner pillar member. FIG. 35 is an enlarged view showing the inner pillar member displaced upward.

In the eighth embodiment, the lock mechanism 112 of the upper door locking device 111 is fixedly fastened in an integral manner with the internal pillar member 121 on the inner surface of the upper end of the door 106. The striker base 113a of the striker 113 is fixedly fastened with bolts across the roof cross member 107 and the side roof rails 101. The striker 113 is made to protrude underneath the side roof rails 101 from the striker base 113a. Also the striker 113 is assembled so as to be able to slide on the roof cross member 107 in relation to the striker base 113a in accordance with the displacement of the internal pillar member 121 that occurs as the member 121 is thrusted upwardly.

As an upper reaction force generating member designed to restrict the upward thrust displacement of the upper end of the internal pillar member 121, a load-bearing member 132 is joined between the side roof rails 101 at a position that corresponds to the upper tip portion of the internal pillar member 121.

The load-bearing member 132 is configured as a box having a peripheral wall 132a, front and rear end walls 132b and a bottom wall 132c. The peripheral wall 132a follows the shape of the inner surface of the side roof rails 101. The bottom wall 132c is shaped at an incline to match the inner incline of the upper end of the door 106 which contacts the upper tip of the internal pillar member 121. The bottom wall 132c is mounted partially inside the peripheral wall 132a.

Consequently, according to the eighth embodiment, the striker 113 slidably moves upward in relation to the striker base 113a when the input force F of a side impact is applied and absorbed as a compression load on the internal pillar member 121 in the longitudinal direction. Since the upper end of the internal pillar member 121 is allowed to have an upward thrust displacement, the lower ends of the side roof rails 101 are deformed and collapsed by the upper tip of the internal pillar member 121 to absorb the energy, as shown in FIG. 35. The upper end of the internal pillar member 121 moves in and bites into the lower end of the peripheral wall 132a of the load-bearing member 132, collides with the bottom wall 132c, and restricts the upward thrust displacement thereof.

As a result, the converted load exerted on the internal pillar member 121 in the longitudinal direction can be transmitted to the side roof rails 101 and the roof cross member 107 via the load-bearing member 132 and used to generate the reaction force of the vehicle body. Also and the upper tip portion of the internal pillar member 121 bites into the load-bearing member 132, whereby the inward rotation of the upper tip portion can be reduced and the reaction force of the vehicle body can be generated more efficiently.

Ninth Embodiment

Figure 36:
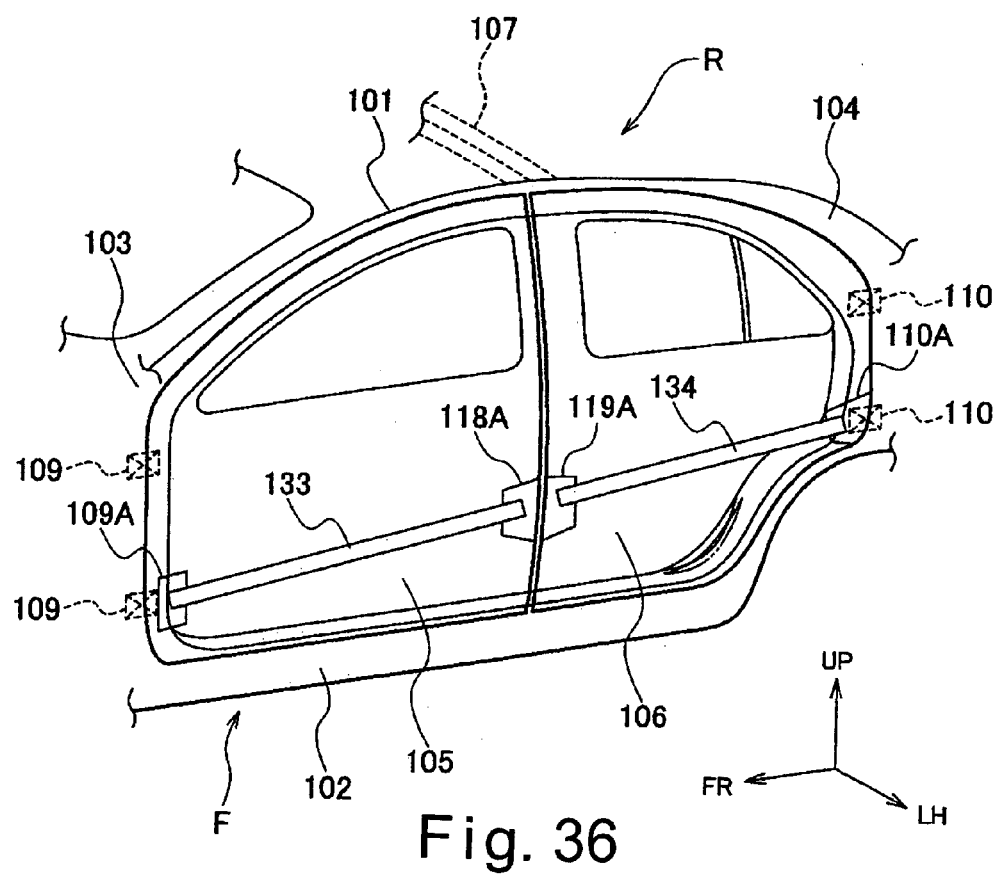
FIG. 36 is a partial side perspective view of a vehicle body frame showing the door arrangement in accordance with a ninth embodiment of the present invention.
Figure 37:
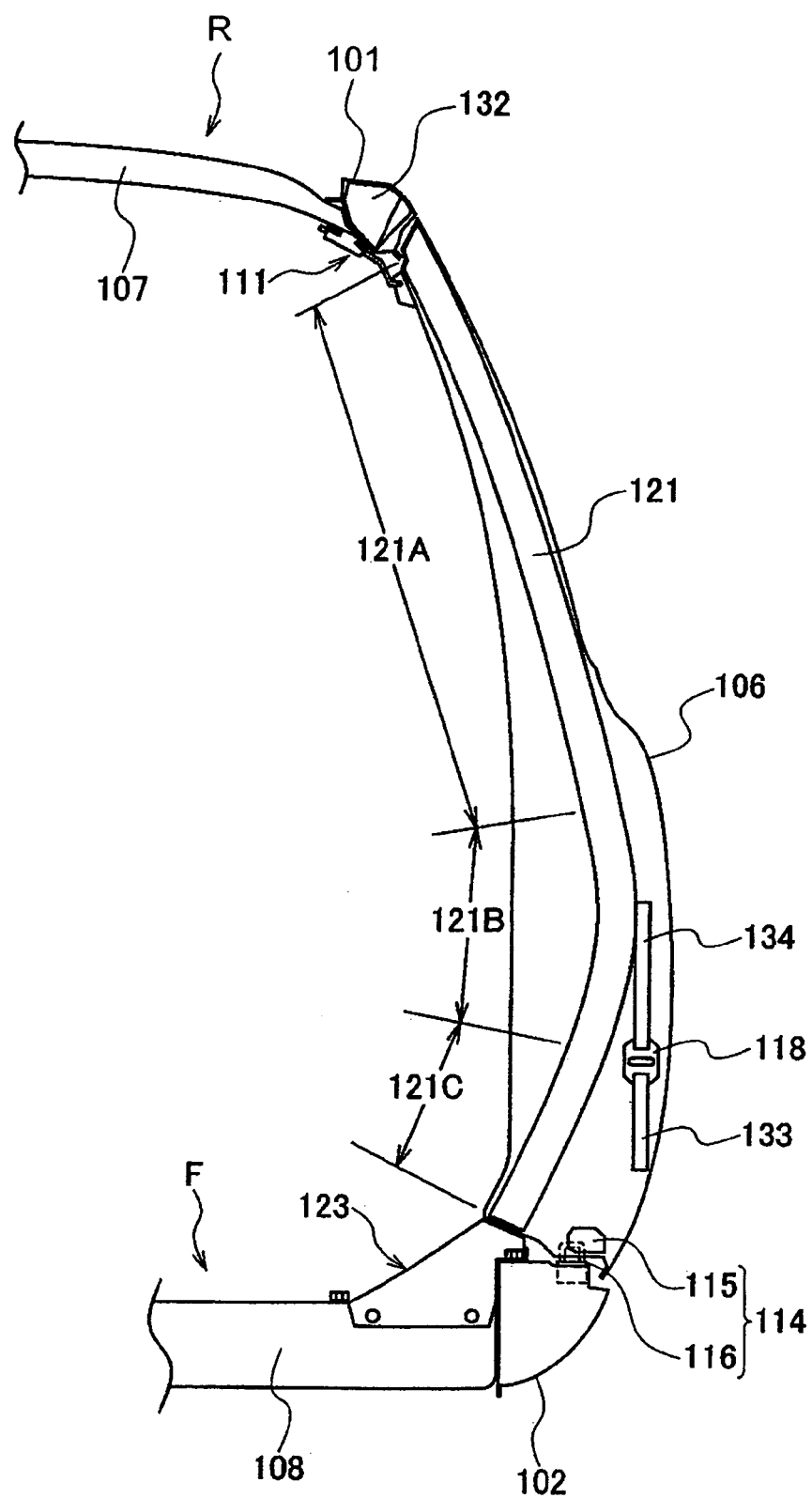
FIG. 37 is a simplified partial diagrammatic cross-sectional view of the vehicle body frame showing the manner in which the inner pillar member of the rear door is arranged in accordance with the ninth embodiment of the present invention.
Figure 38:
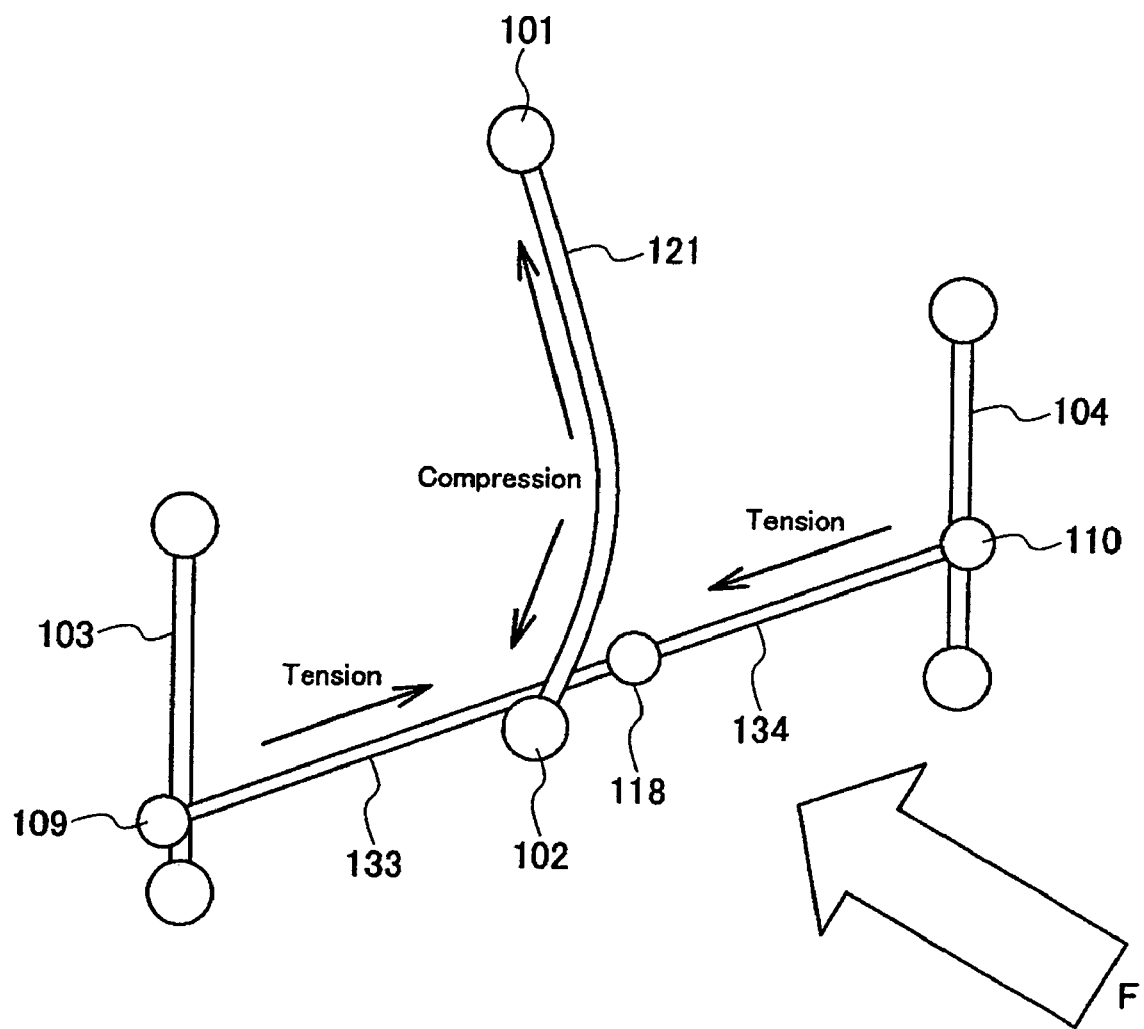
FIG. 38 is a mechanical conceptual model of the ninth embodiment of the present invention.

Referring now to FIGS. 36–38, a vehicle body structure in accordance with a ninth embodiment will now be explained. In view of the similarity between the ninth embodiment and the sixth through eighth embodiments, the parts of the ninth embodiment that are identical to the parts of the sixth through eighth embodiments will be given the same reference numerals as the parts of the sixth through eighth embodiments. Moreover, the descriptions of the parts of the ninth embodiment that are identical to the parts of the sixth through eighth embodiments may be omitted for the sake of brevity.

FIG. 36 is a perspective view showing a door arrangement. FIG. 37 is a cross-sectional view showing manner in which the inner pillar member of the rear door is arranged. FIG. 38 is a mechanical conceptual model of the present embodiment.

In the ninth embodiment, two side impact beams 133 and 134 are disposed in the longitudinal direction of the vehicle body inside the front door 105 and the rear door 106, respectively. The front impact beam 133 is joined to the high-rigidity portions at the front and rear ends of the front door 105. For example, the front impact beam 133 is jointed to a hinge brace 109A provided at the mounting part of the lower door hinge 109, and a lock brace 118A provided at the mounting part of the door lock mechanism 118 of the front door locking device 117.

Similarly, the rear front impact beam 134 is joined to the high-rigidity portions at the front and rear ends of the rear door 106. For example, the rear impact beam 134 is joined to a hinge brace 110A provided at the mounting part of the lower door hinge 110, and a striker brace 119A provided at the mounting part of the striker 119 of the front door locking device 117.

The front door lock mechanism 118 is located at a position that is offset downward from the protruding section 121B of the internal pillar member 121 in the front end of the rear door 106, as shown in FIG. 37, to allow the impact beams 133 and 134 to be arranged substantially in a straight line in the longitudinal direction of the vehicle body when viewed from the side as shown in FIG. 36.

Consequently, in accordance with the ninth embodiment, the impact beams 133 and 134 can be disposed in a space-saving manner at a distance underneath the protruding section 121B of the internal pillar member 121 at substantially the same external position as the protruding section 121B without interfering with the internal pillar member 121. Thus, the impact load generated during side impact is received by the protruding section 121B of the internal pillar member 121, a compression load is generated in the longitudinal direction in the internal pillar member 121, and the matching portions of the front door 105 and the rear door 106 are allowed to develop only minimal deformation into the vehicle passenger compartment, as shown in FIG. 38. At approximately the same time, the impact beams 133 and 134 are caused to function as a single impact beam supported at fixed points adjacent to the door hinges 109 and 110, and to generate a tension load, allowing the input load to be dispersed in the front pillar 103 and rear pillar 104.

The load transmission system based on the internal pillar member 121, and the load transmission system based on the impact beams 133 and 134 are thus allowed to function independently, whereby the efficiency with which a side-impact load is transmitted to the frame members of the vehicle body can be markedly increased.

In the sixth through ninth embodiments, the rear end of the rear door 106 was mounted to freely open and close on the rear pillar 104 with the door hinges 110, but the present arrangement is also applicable to a structure in which the rear door 106 can slide in the rearward direction for slidable opening and closing. Also, the examples were described with reference to an internal pillar member 121 that was disposed inside the front end of the rear door 106, but it is apparent that the internal pillar member 121 can also be disposed in the rear end of the front door 105.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-284997 and 2003-397840. The entire disclosure of Japanese Patent Application Nos. 2003-284997 and 2003-397840 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
   a pillar member configured and arranged to extend in a generally vertical direction of the vehicle body structure between an upper pillar end section and a lower pillar end section;
   an upper vehicle body support configured and arranged to restrict upward movement of the upper pillar end section of the pillar member;
   a lower vehicle body support configured and arranged to restrict downward movement of the lower pillar end section of the pillar member; and
   an input conversion structure configured and arranged relative to the pillar member such that a side-impact input applied inward to the pillar member in a generally horizontal direction from a vehicle exterior is converted as an input that is applied longitudinally along the pillar member in the generally vertical direction of the vehicle body structure.

2. The vehicle body structure according to claim 1, wherein
   the input conversion structure includes a deformable section formed on the lower pillar end section, and the lower pillar end section being arranged such that the pillar member protrudes and curves outwardly of the vehicle body structure.

3. The vehicle body structure according to claim 2, wherein
   the input conversion structure includes a guide section disposed adjacent the lower pillar end section and configured to generate a compressive force in an axial direction of the pillar member in accordance with movement of the lower pillar end section of the pillar member into the passenger compartment during the side impact input.

4. The vehicle body structure according to claim 1, wherein
   the input conversion structure includes a guide section disposed adjacent the lower pillar end section and configured to generate a compressive force in an axial direction of the pillar member in accordance with movement of the lower pillar end section of the pillar member into the passenger compartment during the side impact input.

5. The vehicle body structure according to claim 1, wherein
   the pillar member is configured to form a generally overall C shaped configuration extending from the upper pillar end section to the lower pillar end section with a protruding section disposed between the upper and lower pillar end sections such that the protruding section protruding outward to a greater extent than the upper and lower pillar end sections to receive the side impact input.

6. The vehicle body structure according to claim 3, wherein
the upper pillar end section is joined to the upper vehicle body support via a high-rigidity upper connecting section, and the lower pillar end section is joined to the lower vehicle body support via a high-rigidity lower connecting section.

7. The vehicle body structure according to claim 1, wherein
the upper pillar end section is joined to the upper vehicle body support via a high-rigidity upper connecting section, and the lower pillar end section is joined to the lower vehicle body support via a high-rigidity lower connecting section.

8. The vehicle body structure according to claim 1, wherein
the upper and lower vehicle body supports include an upper connecting section and a lower connecting section, which are connected to the upper and lower pillar end sections, respectively, each of the upper and lower connecting sections having a higher rigidity in its vertical and widthwise directions of the vehicle body structure than a longitudinal rigidity of the pillar member.

9. The vehicle body structure according to claim 3, wherein
the lower pillar end section is configured with a lower longitudinal rigidity than the upper pillar end section such that such that a longitudinal axial collapse strength of the lower pillar end section collapses prior to the upper pillar end section during the side impact input.

10. The vehicle body structure according to claim 3, wherein
the guide section is fixedly supported on the lower vehicle body support such that the guide section is supported with a strength in vertical and widthwise directions of the vehicle body structure that is greater than an axial collapse strength of the lower pillar end section in a longitudinal direction of the pillar member.

11. The vehicle body structure according to claim 2, wherein
the deformable section is formed on front and rear walls of the lower pillar end section of the pillar member.

12. The vehicle body structure according to claim 1, wherein
the lower pillar end section has an axial collapse strength that increases continuously or intermittently in an upward direction from a lowermost end of the lower pillar end.

13. The vehicle body structure according to claim 3, wherein
the guide section has a width in a longitudinal direction of the vehicle body structure that is greater than a width of the lower pillar end section in the longitudinal direction of the vehicle body structure.

14. The vehicle body structure according to claim 3, wherein
the guide section includes an inclined guide surface that faces the lower pillar end section and that is inclined upwardly toward a center of the vehicle body structure so that the deformable section rides up the guide surface during the side impact input.

15. The vehicle body structure according to claim 3, wherein
the guide surface has an inclination angle in relation to a horizontal plane that is greater than an inclination angle of the lower pillar end section in relation to the horizontal plane.

16. The vehicle body structure according to claim 5, wherein
the upper and lower pillar end sections curve at a constant curvature in the direction away from a vehicle passenger compartment with the upper pillar end section having a radius of curvature being equal to or less than a radius of curvature of the lower pillar end section, and the protruding section having a radius of curvature that is smaller than that of the upper pillar end section and the lower pillar end section.

17. The vehicle body structure according to claim 5, wherein
the protruding section of the pillar member has a clearance of about 400 mm to about 800 mm above ground.

18. The vehicle body structure according to claim 1, wherein
the pillar member includes an inner pillar element and an outer pillar element in a forked configuration, such that the inner and outer pillar elements share at least the upper pillar end section of the pillar member and the inner and outer pillar elements separate at the lower pillar end section of the pillar.

19. The vehicle body structure according to claim 18, wherein
the inner pillar element is configured to form a generally overall C shaped configuration extending from the upper pillar end section to the lower pillar end section with a protruding section disposed between the upper and lower pillar end sections, and
the outer pillar element is configured to extend downwardly from the protruding section in a substantially vertical arrangement.

20. The vehicle body structure according to claim 1, further comprising
an additional pillar member located on an opposite side of the vehicle body structure, with the additional pillar member being configured and arranged to extend in a generally vertical direction between the upper and lower vehicle body supports, and
an additional conversion structure located on an opposite side of the vehicle body structure, with the additional conversion structure being configured and arranged relative to the additional pillar member such that a side-impact input applied inward to the additional pillar member in the generally horizontal direction from the vehicle exterior is converted as an input that is applied longitudinally along the additional pillar member in the generally vertical direction of the vehicle body structure.

21. The vehicle body structure according to claim 20, wherein
the upper vehicle body support includes a pair of side roof rails extending in a longitudinal direction of a vehicle body structure with the pillar members connected to the side roof rails, respectively, and
the lower vehicle body support includes a pair of side sills extending in the longitudinal direction of the vehicle body structure with the pillar members connected to the side roof rails, respectively.

22. The vehicle body structure according to claim 21, wherein
the upper vehicle body support includes a roof cross member connecting the side roof rails adjacent upper connecting positions of the pillar members to the side roof rails, and
the lower vehicle body support includes a floor cross member connecting the side sills adjacent lower connecting positions of the pillar members to the side sills.

23. The vehicle body structure accordingly to claim 1, wherein
the pillar member is part of a first door that is movably arranged relative to the upper and lower vehicle supports to freely open and close in a vehicle-body opening section.

24. The vehicle body structure according to claim 23, further comprising
an upper door locking device configured to releasably connect an upper end of the first door with the upper vehicle body support near the upper pillar end section of the pillar member; and
a lower door locking device configured to releasably connect the lower pillar end section of the first door with the lower vehicle body support near the lower pillar end section of the pillar member.

25. The vehicle body structure according to claim 24, wherein
the upper vehicle body support includes an upper reaction force generating member that is configured to suppress a rotation moment generated in the upper pillar end section in a direction into a vehicle passenger compartment; and
the lower vehicle body support includes a lower reaction force generating member that is configured to suppress a rotation moment generated in the lower pillar end section in a direction into the vehicle passenger compartment.

26. The vehicle body structure according to claim 25, wherein
the upper reaction force generating member comprises an upper frame member and a base that is joined between a roof cross member and a side roof rail, and the upper frame member being located in an area that corresponds to the upper pillar end section of the pillar member to support an inner surface of the upper end of the first door.

27. The vehicle body structure according to claim 26, wherein
the inner surface of the upper end of the first door includes a protruding member joined to the pillar member and arranged to interlock with a lower end of the upper frame member in the vertical direction when the side-impact input is applied to the pillar member.

28. The vehicle body structure according to claim 25, wherein
the upper door locking device is configured to slide relative to the upper vehicle body support when the side-impact input is applied to the pillar member causing the upper end of the first door to be displaced upwardly in response to an upward thrust displacement of the upper pillar end section of the pillar member; and
the upper reaction force generating member includes a load-bearing member disposed at a position that corresponds to the upper pillar end section, the load-bearing member being configured and arranged to restrict the upward thrust displacement of the upper pillar end section of the pillar member.

29. The vehicle body structure according to claim 25, wherein
the lower reaction force generating member comprises a lower frame member that is connected across a side sill and a front cross member, the lower frame member having a load bearing surface located in an area that corresponds to the lower pillar end section of the pillar member to support an inner contact surface of the lower end of the first door.

30. The vehicle body structure according to claim 29, wherein
the load-bearing surface of the lower frame member and the inner contact surface of the lower end of the first door are shaped as inclined surfaces that are inclined externally downward in the widthwise direction of the vehicle body structure, and the load-bearing surface having an elastic body that is brought into elastic contact with and compressed by the inner contact surface of the lower end of the first door when the first door is closed.

31. The vehicle body structure according to claim 23, further comprising
a second door movably arranged relative to the upper and lower vehicle supports freely open and close in the vehicle-body opening section such that the first and second doors closely mate in a front and back arrangement.

32. The vehicle body structure according to claim 31, wherein
the first and second doors include a door locking device that releasably locked the first and second doors together with one of the first and second doors having an end face with a striker of the door locking device that engages with and disengages from a door lock mechanism of the door locking device disposed on an end face on the other one first and second doors.

33. The vehicle body structure according to claim 32, wherein
the first door includes a first interior impact beam with a first end of the first interior impact beam joined to the first door at a high-rigidity portion of the first door located at the door locking device, and a second end of the first interior impact beam joined to the first door at a high-rigidity portion on an side opposite of the first door from the door locking device, and
the second door includes a second interior impact beam with a first end of the second interior impact beam joined to the second door at a high-rigidity portion of the second door located at the door locking device, and a second end of the second interior impact beam joined to the second door at a high-rigidity portion on an side opposite of the second door from the door locking device.

34. The vehicle body structure according to claim 33, wherein
the pillar member of the first door is configured to form a generally overall C shaped configuration extending from the upper pillar end section to the lower pillar end section with a protruding section disposed between the upper and lower pillar end sections such that the protruding section protruding outward to a greater extent than the upper and lower pillar end sections to receive the side impact input.

35. The vehicle body structure according to claim 33, wherein the door locking device has a mounting position that is offset downwardly from a vertical center point of the protruding section of the pillar member, and the first and second impact beams are arranged substantially in a straight line in generally the longitudinal direction of the vehicle body structure when viewed from a side of the vehicle body structure.

36. The vehicle body structure according to claim 31, wherein the upper vehicle body support includes a pair of side roof rails extending in a longitudinal direction of a vehicle body structure and a roof cross member connecting the side roof rails, the lower vehicle body support includes a pair of side sills extending in the longitudinal direction of the vehicle body structure and a floor cross member connecting the side sills, and one of the side roof rails and one of the side sills that are located on the same side of the vehicle body structure are connected together in the vertical direction of the vehicle body structure by a front pillar and a rear pillar such that the vehicle-body opening section is defined therebetween.

37. A vehicle body structure comprising:

vertical structural means for vertically supporting the vehicle body structure;

upper structural means for restricting upward movement of the vertical structural means;

lower structural means for restricting downward movement of the vertical structural means; and input conversion means for converting a side-impact input applied inward to the vertical structural means in a generally horizontal direction from a vehicle exterior to an input that is applied longitudinally along the vertical structural means in a generally vertical direction of the vehicle body structure.

* * * * *